United States Patent
Bae et al.

(10) Patent No.: US 12,167,399 B2
(45) Date of Patent: Dec. 10, 2024

(54) METHOD AND USER EQUIPMENT FOR PERFORMING UPLINK TRANSMISSION WITH RESOURCE ALLOCATION, AND METHOD FOR PERFORMING UPLINK RECEPTION WITH RESOURCE ALLOCATION

(71) Applicant: LG Electronics Inc., Seoul (KR)

(72) Inventors: Duckhyun Bae, Seoul (KR); Joonkui Ahn, Seoul (KR); Hyunho Lee, Seoul (KR); Seonwook Kim, Seoul (KR); Sechang Myung, Seoul (KR)

(73) Assignee: LG Electronics Inc., Seoul (KR)

(*) Notice: Subject to any disclaimer, the term of this patent is extended or adjusted under 35 U.S.C. 154(b) by 475 days.

(21) Appl. No.: 17/422,127

(22) PCT Filed: Jan. 13, 2020

(86) PCT No.: PCT/KR2020/000558
§ 371 (c)(1),
(2) Date: Jul. 9, 2021

(87) PCT Pub. No.: WO2020/145772
PCT Pub. Date: Jul. 16, 2020

(65) Prior Publication Data
US 2022/0132495 A1  Apr. 28, 2022

Related U.S. Application Data

(60) Provisional application No. 62/825,917, filed on Mar. 29, 2019.

(30) Foreign Application Priority Data

| Jan. 11, 2019 | (KR) | 10-2019-0004150 |
| Feb. 15, 2019 | (KR) | 10-2019-0018255 |
| Aug. 16, 2019 | (KR) | 10-2019-0100305 |

(51) Int. Cl.
*H04W 72/21* (2023.01)
*H04L 1/1607* (2023.01)
(Continued)

(52) U.S. Cl.
CPC ........... *H04W 72/21* (2023.01); *H04L 1/1642* (2013.01); *H04L 5/1469* (2013.01); *H04W 72/0446* (2013.01)

(58) Field of Classification Search
None
See application file for complete search history.

(56) References Cited

U.S. PATENT DOCUMENTS

| 2019/0124565 A1* | 4/2019 | Suzuki | H04L 1/00 |
| 2021/0250142 A1* | 8/2021 | Wang | H04L 5/0053 |
| 2021/0307016 A1* | 9/2021 | Takeda | H04W 72/0446 |

FOREIGN PATENT DOCUMENTS

WO  WO2016144143  9/2016

OTHER PUBLICATIONS

3GPP, "3rd Generation Partnership Project; Technical Specification Group Radio Access Network; Study on physical layer enhancements for NR ultra-reliable and low latency case (URLLC) (Release 16)," 3GPP TR 38.824 V1.0.0, Nov. 2018, 23 pages.
(Continued)

*Primary Examiner* — Anh Ngoc M Nguyen
(74) *Attorney, Agent, or Firm* — Fish & Richardson P.C.

(57) ABSTRACT

Provided is a user equipment which: receives resource allocation; determines N number of transmission resources on the basis of the resource allocation, wherein N is an integer greater than 1; determines a transport block size (TBS) associated with the N number of transmission resources and a redundancy version (RV) value for each of the N number of transmission resources; and performs uplink transmission in at least one transmission resource
(Continued)

among the N number of transmission resources on the basis of the TBS and an RV value for the at least one transmission resource.

9 Claims, 11 Drawing Sheets

(51) Int. Cl.
*H04L 5/14* (2006.01)
*H04W 72/0446* (2023.01)

(56) References Cited

OTHER PUBLICATIONS

3GPP, "5G; NR; Physical layer procedures for data (3GPP TS 38.214 version 15.3.0 Release 15)," ETSI TS 138 214 V15.3.0, Oct. 2018, 100 pages.
3GPP, "5G; NR; Radio Resource Control (RRC); Protocol specification (3GPP TS 38.331 version 15.3.0 Release 15)," ETSI TS 138 331 V15.3.0, Oct. 2018, 442 pages.
International Search Report and Written Opinion in International Appln. No. PCT/KR2020/000558, dated May 1, 2020, 15 pages (with English translation).

\* cited by examiner

FIG. 10
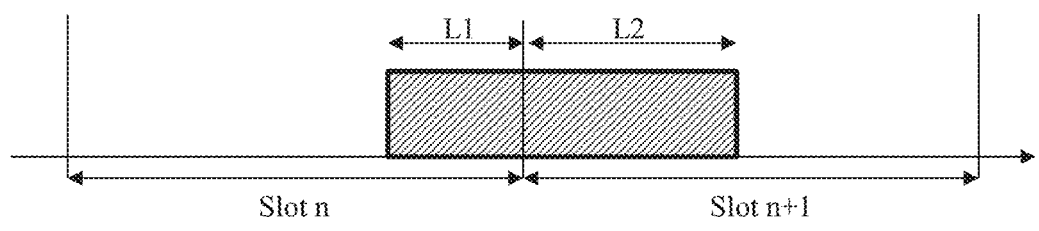
(a)
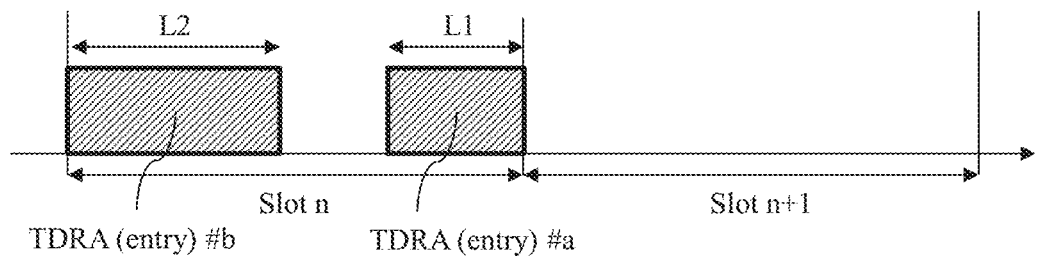
(b)

FIG. 13
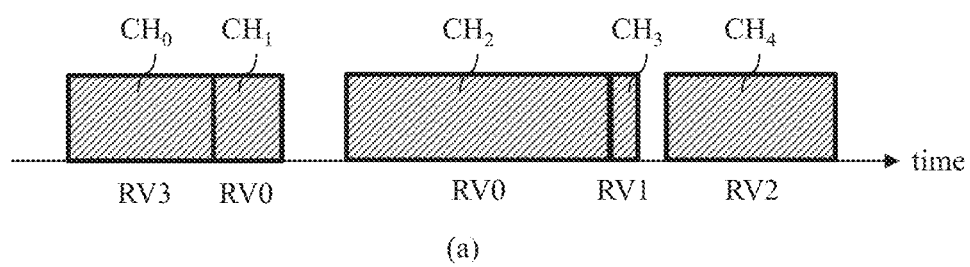
(a)
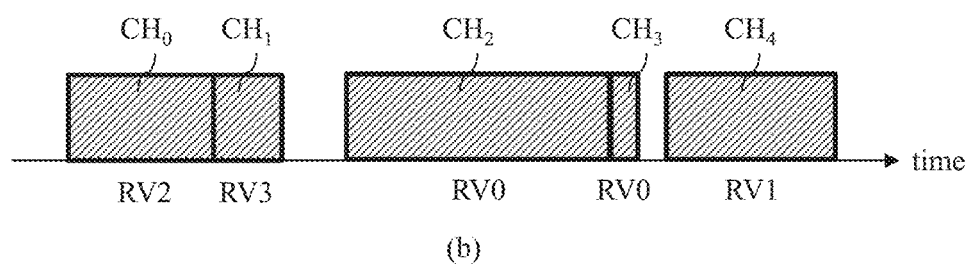
(b)
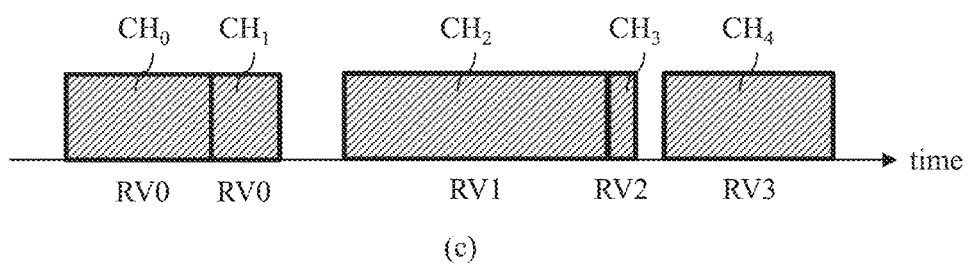
(c)

METHOD AND USER EQUIPMENT FOR PERFORMING UPLINK TRANSMISSION WITH RESOURCE ALLOCATION, AND METHOD FOR PERFORMING UPLINK RECEPTION WITH RESOURCE ALLOCATION

CROSS-REFERENCE TO RELATED APPLICATIONS

This application is a National Stage application under 35 U.S.C. § 371 of International Application No. PCT/KR2020/000558, filed on Jan. 13, 2020, which claims the benefit of U.S. Provisional Application No. 62/825,917, filed on Feb. 15, 2019, Korean Application Nos. 10-2019-0100305, filed on Aug. 16, 2019, 10-2019-0018255, filed on Feb. 15, 2019, and 10-2019-0004150, filed on Jan. 11, 2019. The disclosures of the prior applications are incorporated by reference in their entirety.

TECHNICAL FIELD

The present disclosure relates to a wireless communication system.

BACKGROUND

A variety of technologies, such as machine-to-machine (M2M) communication, machine type communication (MTC), and a variety of devices demanding high data throughput, such as smartphones and tablet personal computers (PCs), have emerged and spread. Accordingly, the volume of data throughput demanded to be processed in a cellular network has rapidly increased. In order to satisfy such rapidly increasing data throughput, carrier aggregation technology or cognitive radio technology for efficiently employing more frequency bands and multiple input multiple output (MIMO) technology or multi-base station (BS) cooperation technology for raising data capacity transmitted on limited frequency resources have been developed.

As more and more communication devices have required greater communication capacity, there has been a need for enhanced mobile broadband (eMBB) communication relative to legacy radio access technology (RAT). In addition, massive machine type communication (mMTC) for providing various services at anytime and anywhere by connecting a plurality of devices and objects to each other is one main issue to be considered in next-generation communication.

Communication system design considering services/user equipment (UEs) sensitive to reliability and latency is also under discussion. The introduction of next-generation RAT is being discussed in consideration of eMBB communication, mMTC, ultra-reliable and low-latency communication (URLLC), and the like.

SUMMARY

As new radio communication technology has been introduced, the number of UEs to which a BS should provide services in a prescribed resource region is increasing and the volume of data and control information that the BS transmits/receives to/from the UEs to which the BS provides services is also increasing. Since the amount of resources available to the BS for communication with the UE(s) is limited, a new method for the BS to efficiently receive/transmit uplink/downlink data and/or uplink/downlink control information from/to the UE(s) using the limited radio resources is needed. In other words, due to increase in the density of nodes and/or the density of UEs, a method for efficiently using high-density nodes or high-density UEs for communication is needed.

A method to efficiently support various services with different requirements in a wireless communication system is also needed.

Overcoming delay or latency is an important challenge to applications, performance of which is sensitive to delay/latency.

The objects to be achieved with the present disclosure are not limited to what has been particularly described hereinabove and other objects not described herein will be more clearly understood by persons skilled in the art from the following detailed description.

According to an aspect of the present disclosure, a method of performing an uplink transmission by a user equipment (UE) in a wireless communication system is provided. The method may include receiving a resource allocation, determining N transmission resources based on the resource allocation, N being an integer greater than 1, determining a transport block size (TBS) related to the N transmission resources and a redundancy version (RV) value for each of the N transmission resources, and performing the uplink transmission in at least one of the N transmission resources based on the TBS and an RV value for the at least one transmission resource.

According to another aspect of the present disclosure, a UE for performing an uplink transmission in a wireless communication system is provided. The UE may include at least one transceiver, at least one processor, and at least one computer memory operably coupled to the at least one processor and storing instructions which when executed, cause the at least one processor to perform operations. The operations may comprise receiving a resource allocation, determining N transmission resources based on the resource allocation, N being an integer greater than 1, determining a TBS related to the N transmission resources and an RV value for each of the N transmission resources, and performing the uplink transmission in at least one of the N transmission resources based on the TBS and an RV value for the at least one transmission resource.

According to another aspect of the present disclosure, a method of performing an uplink reception by a base station (BS) in a wireless communication system is provided. The method may include transmitting a resource allocation, determining N reception resources based on the resource allocation, N being an integer greater than 1, determining a TBS related to the N reception resources and an RV value for each of the N reception resources, and performing the uplink reception in at least one of the N reception resources based on the TBS and an RV value for the at least one reception resource.

According to each aspect of the present disclosure, the determination of an RV value for each of the N transmission resources may include sequentially mapping RV values of an RV sequence to the N transmission resources in time order, starting from a largest of the N transmission resources.

According to each aspect of the present disclosure, the TBS may be determined based on a total number of symbols occupied by the N transmission resources.

According to each aspect of the present disclosure, the BS may transmit information indicating an RV sequence among a plurality of predetermined RV sequences. The UE may receive the information indicating the RV sequence among the plurality of predetermined RV sequences.

According to each aspect of the present disclosure, the resource allocation may include a time-domain resource allocation for a plurality of slots. The N transmission resources may belong to slots other than slots without available symbols for the uplink transmission among the plurality of slots.

According to each aspect of the present disclosure, each of the N transmission resources may include at least one symbol available for the uplink transmission.

According to each aspect of the present disclosure, a time division duplex (TDD) uplink-downlink configuration may be provided to the UE by the BS. Symbols available for the uplink transmission may be determined based on the TDD uplink-downlink configuration.

According to each aspect of the present disclosure, the N transmission resources may include at least two transmission resources separated based on invalid symbols for the uplink transmission. The invalid symbols may be determined based on at least the TDD uplink-downlink configuration.

According to each aspect of the present disclosure, the N transmission resources may include at least two transmission resources separated by a slot boundary.

The foregoing solutions are merely a part of the examples of the present disclosure and various examples into which the technical features of the present disclosure are incorporated may be derived and understood by persons skilled in the art from the following detailed description.

According to implementation(s) of the present disclosure, a wireless communication signal may be efficiently transmitted/received. Accordingly, the total throughput of a wireless communication system may be raised.

According to implementation(s) of the present disclosure, various services with different requirements may be efficiently supported in a wireless communication system.

According to implementation(s) of the present disclosure, delay/latency generated during radio communication between communication devices may be reduced.

The effects according to the present disclosure are not limited to what has been particularly described hereinabove and other effects not described herein will be more clearly understood by persons skilled in the art related to the present disclosure from the following detailed description.

BRIEF DESCRIPTION OF DRAWINGS

The accompanying drawings, which are included to provide a further understanding of the present disclosure, illustrate examples of implementations of the present disclosure and together with the detailed description serve to explain implementations of the present disclosure:

FIG. 10 is a diagram illustrating an example of the present disclosure,

FIG. 13 is a diagram illustrating methods of applying a redundancy version (RV) sequence according to some examples of the present disclosure.

DETAILED DESCRIPTION

Figure 1:
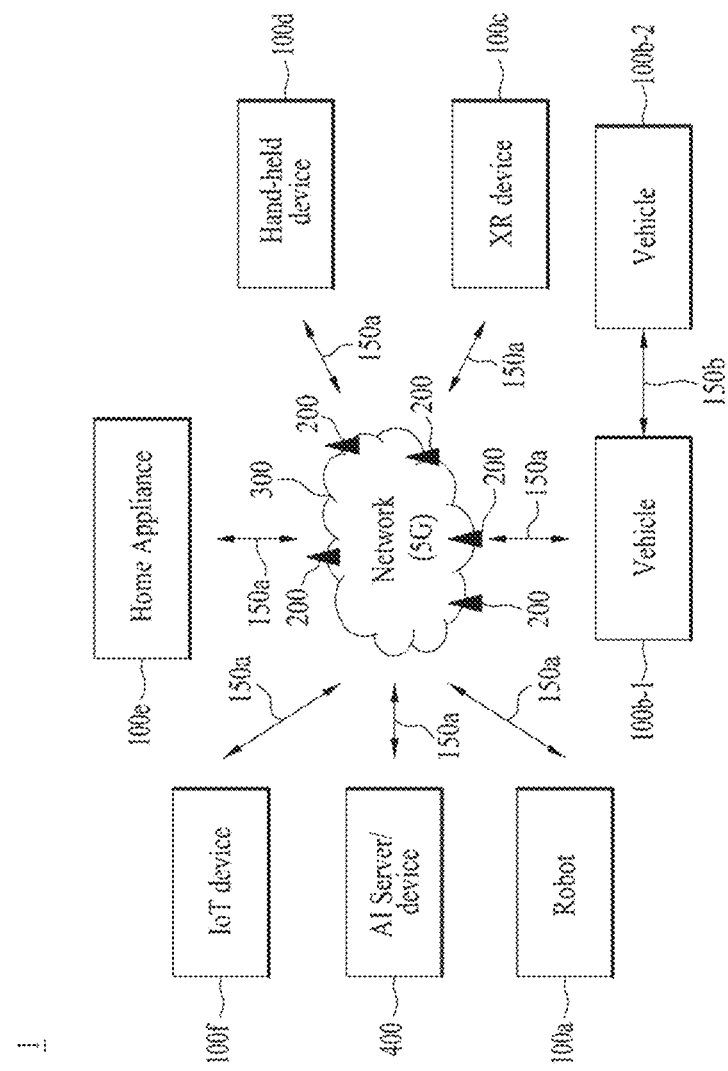
FIG. 1 illustrates an example of a communication system 1 to which implementations of the present disclosure are applied.

Hereinafter, implementations according to the present disclosure will be described in detail with reference to the accompanying drawings. The detailed description, which will be given below with reference to the accompanying drawings, is intended to explain exemplary implementations of the present disclosure, rather than to show the only implementations that may be implemented according to the present disclosure. The following detailed description includes specific details in order to provide a thorough understanding of the present disclosure. However, it will be apparent to those skilled in the art that the present disclosure may be practiced without such specific details.

In some instances, known structures and devices may be omitted or may be shown in block diagram form, focusing on important features of the structures and devices, so as not to obscure the concept of the present disclosure. The same reference numbers will be used throughout the present disclosure to refer to the same or like parts.

A technique, a device, and a system described below may be applied to a variety of wireless multiple access systems. The multiple access systems may include, for example, a code division multiple access (CDMA) system, a frequency division multiple access (FDMA) system, a time division multiple access (TDMA) system, an orthogonal frequency division multiple access (OFDMA) system, a single-carrier frequency division multiple access (SC-FDMA) system, a multi-carrier frequency division multiple access (MC-FDMA) system, etc. CDMA may be implemented by radio technology such as universal terrestrial radio access (UTRA) or CDMA2000. TDMA may be implemented by radio technology such as global system for mobile communications (GSM), general packet radio service (GPRS), enhanced data rates for GSM evolution (EDGE) (i.e., GERAN), etc. OFDMA may be implemented by radio technology such as institute of electrical and electronics engineers (IEEE) 802.11 (Wi-Fi), IEEE 802.16 (WiMAX), IEEE 802.20, evolved-UTRA (E-UTRA), etc. UTRA is part of universal mobile telecommunications system (UMTS) and 3rd generation partnership project (3GPP) long-term evolution (LTE) is part of E-UMTS using E-UTRA. 3GPP LTE adopts OFDMA on downlink (DL) and adopts SC-FDMA on uplink (UL). LTE-advanced (LTE-A) is an evolved version of 3GPP LTE.

For convenience of description, description will be given under the assumption that the present disclosure is applied to LTE and/or new RAT (NR). However, the technical features of the present disclosure are not limited thereto. For example, although the following detailed description is given based on mobile communication systems corresponding to 3GPP LTE/NR systems, the mobile communication systems are applicable to other arbitrary mobile communication systems except for matters that are specific to the 3GPP LTE/NR system.

For terms and techniques that are not described in detail among terms and techniques used in the present disclosure, reference may be made to 3GPP LTE standard specifications, for example, 3GPP TS 36.211, 3GPP TS 36.212, 3GPP TS 36.213, 3GPP TS 36.321, 3GPP TS 36.300, 3GPP TS 36.331, etc. and 3GPP NR standard specifications, for example, 3GPP TS 38.211, 3GPP TS 38.212, 3GPP TS 38.213, 3GPP TS 38.214, 3GPP TS 38.300, 3GPP TS 38.331, etc.

In examples of the present disclosure described later, if a device "assumes" something, this may mean that a channel transmission entity transmits a channel in compliance with the corresponding "assumption". This also may mean that a channel reception entity receives or decodes the channel in the form of conforming to the "assumption" on the premise that the channel has been transmitted in compliance with the "assumption".

In the present disclosure, a user equipment (UE) may be fixed or mobile. Each of various devices that transmit and/or receive user data and/or control information by communicating with a base station (BS) may be the UE. The term UE may be referred to as terminal equipment, mobile station (MS), mobile terminal (MT), user terminal (UT), subscriber station (SS), wireless device, personal digital assistant (PDA), wireless modem, handheld device, etc. In the present disclosure, a BS refers to a fixed station that communicates with a UE and/or another BS and exchanges data and control information with a UE and another BS. The term BS may be referred to as advanced base station (ABS), Node-B (NB), evolved Node-B (eNB), base transceiver system (BTS), access point (AP), processing server (PS), etc. Particularly, a BS of a universal terrestrial radio access (UTRAN) is referred to as an NB, a BS of an evolved-UTRAN (E-UTRAN) is referred to as an eNB, and a BS of new radio access technology network is referred to as a gNB. Hereinbelow, for convenience of description, the NB, eNB, or gNB will be referred to as a BS regardless of the type or version of communication technology.

In the present disclosure, a node refers to a fixed point capable of transmitting/receiving a radio signal to/from a UE by communication with the UE. Various types of BSs may be used as nodes regardless of the names thereof. For example, a BS, NB, eNB, pico-cell eNB (PeNB), home eNB (HeNB), relay, repeater, etc. may be a node. Furthermore, a node may not be a BS. For example, a radio remote head (RRH) or a radio remote unit (RRU) may be a node. Generally, the RRH and RRU have power levels lower than that of the BS. Since the RRH or RRU (hereinafter, RRH/RRU) is connected to the BS through a dedicated line such as an optical cable in general, cooperative communication according to the RRH/RRU and the BS may be smoothly performed relative to cooperative communication according to BSs connected through a wireless link. At least one antenna is installed per node. An antenna may refer to a physical antenna port or refer to a virtual antenna or an antenna group. The node may also be called a point.

In the present disclosure, a cell refers to a specific geographical area in which one or more nodes provide communication services. Accordingly, in the present disclosure, communication with a specific cell may mean communication with a BS or a node providing communication services to the specific cell. A DL/UL signal of the specific cell refers to a DL/UL signal from/to the BS or the node providing communication services to the specific cell. A cell providing UL/DL communication services to a UE is especially called a serving cell. Furthermore, channel status/quality of the specific cell refers to channel status/quality of a channel or a communication link generated between the BS or the node providing communication services to the specific cell and the UE. In 3GPP-based communication systems, the UE may measure a DL channel state from a specific node using cell-specific reference signal(s) (CRS(s)) transmitted on a CRS resource and/or channel state information reference signal(s) (CSI-RS(s)) transmitted on a CSI-RS resource, allocated to the specific node by antenna port(s) of the specific node.

A 3GPP-based communication system uses the concept of a cell in order to manage radio resources, and a cell related with the radio resources is distinguished from a cell of a geographic area.

The "cell" of the geographic area may be understood as coverage within which a node may provide services using a carrier, and the "cell" of the radio resources is associated with bandwidth (BW), which is a frequency range configured by the carrier. Since DL coverage, which is a range within which the node is capable of transmitting a valid signal, and UL coverage, which is a range within which the node is capable of receiving the valid signal from the UE, depend upon a carrier carrying the signal, coverage of the node may also be associated with coverage of the "cell" of radio resources used by the node. Accordingly, the term "cell" may be used to indicate service coverage by the node sometimes, radio resources at other times, or a range that a signal using the radio resources may reach with valid strength at other times.

In 3GPP communication standards, the concept of the cell is used in order to manage radio resources. The "cell" associated with the radio resources is defined by a combination of DL resources and UL resources, that is, a combination of a DL component carrier (CC) and a UL CC. The cell may be configured by the DL resources only or by the combination of the DL resources and the UL resources. If carrier aggregation is supported, linkage between a carrier frequency of the DL resources (or DL CC) and a carrier frequency of the UL resources (or UL CC) may be indicated by system information. For example, the combination of the DL resources and the UL resources may be indicated by system information block type 2 (SIB2) linkage. In this case, the carrier frequency may be equal to or different from a center frequency of each cell or CC. When carrier aggregation (CA) is configured, the UE has only one radio resource control (RRC) connection with a network. During RRC connection establishment/re-establishment/handover, one serving cell provides non-access stratum (NAS) mobility information. During RRC connection re-establishment/handover, one serving cell provides security input. This cell is referred to as a primary cell (Pcell). The Pcell refers to a cell operating on a primary frequency on which the UE performs an initial connection establishment procedure or initiates a connection re-establishment procedure. According to UE capability, secondary cells (Scells) may be configured to form a set of serving cells together with the Pcell. The Scell may be configured after completion of RRC connection establishment and used to provide additional radio resources in addition to resources of a specific cell (SpCell). A carrier corresponding to the Pcell on DL is referred to as a downlink primary CC (DL PCC), and a carrier corresponding to the Pcell on UL is referred to as an uplink primary CC (UL PCC). A carrier corresponding to the Scell on DL is referred to as a downlink secondary CC (DL SCC), and a carrier corresponding to the Scell on UL is referred to as an uplink secondary CC (UL SCC).

For dual connectivity (DC) operation, the term SpCell refers to the Pcell of a master cell group (MCG) or the Pcell of a secondary cell group (SCG). The SpCell supports PUCCH transmission and contention-based random access and is always activated. The MCG is a group of service cells associated with a master node (e.g., BS) and includes the SpCell (Pcell) and optionally one or more Scells. For a UE configured with DC, the SCG is a subset of serving cells associated with a secondary node and includes a PSCell and 0 or more Scells. For a UE in RRC_CONNECTED state, not configured with CA or DC, only one serving cell including only the Pcell is present. For a UE in RRC_CONNECTED state, configured with CA or DC, the term serving cells refers to a set of cells including SpCell(s) and all Scell(s). In DC, two medium access control (MAC) entities, i.e., one MAC entity for the MCG and one MAC entity for the SCG, are configured for the UE.

A UE with which CA is configured and DC is not configured may be configured with a Pcell PUCCH group, which includes the Pcell and 0 or more Scells, and an Scell PUCCH group, which includes only Scell(s). For the Scells, an Scell on which a PUCCH associated with the corresponding cell is transmitted (hereinafter, PUCCH cell) may be configured. An Scell indicated as the PUCCH Scell belongs to the Scell PUCCH group and PUCCH transmission of related UCI is performed on the PUCCH Scell. An Scell, which is not indicated as the PUCCH Scell or in which a cell indicated for PUCCH transmission is a Pcell, belongs to the Pcell PUCCH group and PUCCH transmission of related UCI is performed on the Pcell.

In a wireless communication system, the UE receives information on DL from the BS and the UE transmits information on UL to the BS. The information that the BS and UE transmit and/or receive includes data and a variety of control information and there are various physical channels according to types/usage of the information that the UE and the BS transmit and/or receive.

The 3GPP-based communication standards define DL physical channels corresponding to resource elements carrying information originating from a higher layer and DL physical signals corresponding to resource elements which are used by the physical layer but do not carry the information originating from the higher layer. For example, a physical downlink shared channel (PDSCH), a physical broadcast channel (PBCH), a physical multicast channel (PMCH), a physical control format indicator channel (PCFICH), a physical downlink control channel (PDCCH), etc. are defined as the DL physical channels, and a reference signal (RS) and a synchronization signal (SS) are defined as the DL physical signals. The RS, which is also referred to as a pilot, represents a signal with a predefined special waveform known to both the BS and the UE. For example, a demodulation reference signal (DMRS), a channel state information RS (CSI-RS), etc. are defined as DL RSs. The 3GPP-based communication standards define UL physical channels corresponding to resource elements carrying information originating from the higher layer and UL physical signals corresponding to resource elements which are used by the physical layer but do not carry the information originating from the higher layer. For example, a physical uplink shared channel (PUSCH), a physical uplink control channel (PUCCH), and a physical random access channel (PRACH) are defined as the UL physical channels, and a DMRS for a UL control/data signal, a sounding reference signal (SRS) used for UL channel measurement, etc. are defined.

In the present disclosure, the PDCCH refers to a set of time-frequency resources (e.g., resource elements) that carry downlink control information (DCI), and the PDSCH refers to a set of time-frequency resources that carry DL data. The PUCCH, PUSCH, and PRACH refer to a set of time-frequency resources that carry uplink control information (UCI), UL data, and random access signals, respectively. In the following description, the meaning of "The UE transmits/receives the PUCCH/PUSCH/PRACH" is that the UE transmits/receives the UCI/UL data/random access signals on or through the PUSCH/PUCCH/PRACH, respectively. In addition, the meaning of "the BS transmits/receives the PBCH/PDCCH/PDSCH" is that the BS transmits the broadcast information/DL data/DCI on or through a PBCH/PDCCH/PDSCH, respectively.

As more and more communication devices have required greater communication capacity, there has been a need for enhanced mobile broadband (eMBB) communication relative to legacy radio access technology (RAT). In addition, massive MTC (mMTC) for providing various services at anytime and anywhere by connecting a plurality of devices and objects to each other is one main issue to be considered in next-generation communication. Further, communication system design considering services/UEs sensitive to reliability and latency is also under discussion. The introduction of next-generation RAT is being discussed in consideration of eMBB communication, mMTC, ultra-reliable and low-latency communication (URLLC), and the like. Currently, in 3GPP, a study on the next-generation mobile communication systems after EPC is being conducted. In the present disclosure, for convenience, the corresponding technology is referred to a new RAT (NR) or fifth-generation (5G) RAT, and a system using NR or supporting NR is referred to as an NR system.

FIG. 1 illustrates an example of a communication system 1 to which implementations of the present disclosure are applied. Referring to FIG. 1, the communication system 1 applied to the present disclosure includes wireless devices, BSs, and a network. Here, the wireless devices represent devices performing communication using RAT (e.g., 5G NR or LTE (e.g., E-UTRA)) and may be referred to as communication/radio/5G devices. The wireless devices may include, without being limited to, a robot 100a, vehicles 100b-1 and 100b-2, an extended reality (XR) device 100c, a hand-held device 100d, a home appliance 100e, an Internet of Things (IoT) device 100f, and an artificial intelligence (AI) device/server 400. For example, the vehicles may include a vehicle having a wireless communication function, an autonomous driving vehicle, and a vehicle capable of performing vehicle-to-vehicle communication. Here, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may also be implemented as wireless devices and a specific wireless device 200a may operate as a BS/network node with respect to another wireless device.

The wireless devices 100a to 100f may be connected to a network 300 via BSs 200. AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. vehicle-to-vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a and 150b may be established between the wireless devices 100a to 100f and the BSs 200 and between the wireless devices 100a to 100f). Here, the wireless communication/connections such as UL/DL communication 150a and sidelink communication 150b (or, device-to-device (D2D) communication) may be established by various RATs (e.g., 5G NR). The wireless devices and the BSs/wireless devices may transmit/receive radio signals to/from each other through the wireless communication/connections 150a and 150b. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 2:
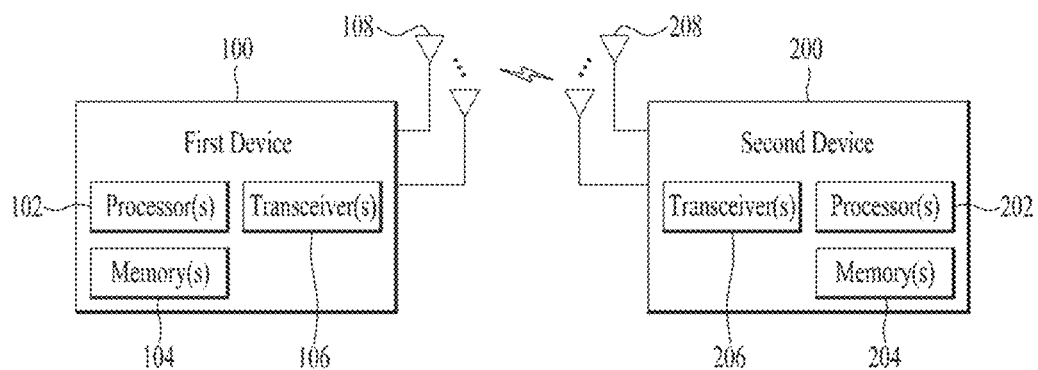
FIG. 2 is a block diagram illustrating examples of communication devices capable of performing a method according to the present disclosure.

FIG. 2 is a block diagram illustrating examples of communication devices capable of performing a method according to the present disclosure. Referring to FIG. 2, a first wireless device 100 and a second wireless device 200 may transmit and/or receive radio signals through a variety of RATs (e.g., LTE and NR). Here, {the first wireless device 100 and the second wireless device 200} may correspond to {the wireless device 100x and the BS 200} and/or {the wireless device 100x and the wireless device 100x} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the above-described/proposed functions, procedures, and/or methods. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may perform a part or all of processes controlled by the processor(s) 102 or store software code including instructions for performing the above-described/ proposed procedures and/or methods. Here, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 is used interchangeably with radio frequency (RF) unit(s). In the present disclosure, the wireless device may represent the communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the above-described/proposed functions, procedures, and/or methods. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may perform a part or all of processes controlled by the processor(s) 202 or store software code including instructions for performing the above-described/ proposed procedures and/or methods. Here, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 is used interchangeably with RF unit(s). In the present disclosure, the wireless device may represent the communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as a physical (PHY) layer, medium access control (MAC) layer, a radio link control (RLC) layer, a packet data convergence protocol (PDCP) layer, radio resource control (RRC) layer, and a service data adaptation protocol (SDAP) layer). The one or more processors 102 and 202 may generate one or more protocol data units (PDUs) and/or one or more service data units (SDUs) according to the functions, procedures, proposals, and/or methods disclosed in this document. The one or more processors 102 and 202 may generate messages, control information, data, or information according to the functions, procedures, proposals, and/or methods disclosed in this document. The one or more processors 102 and 202 may generate signals (e.g., baseband signals) including PDUs, SDUs, messages, control information, data, or information according to the functions, procedures, proposals, and/or methods disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the functions, procedures, proposals, and/or methods disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The functions, procedures, proposals, and/or methods disclosed in this document may be implemented using firmware or software, and the firmware or software may be configured to include the modules, procedures, or functions. Firmware or software configured to perform the functions, procedures, proposals, and/or methods disclosed in this document may be included in the one or more processors 102 and 202 or stored in the one or more memories 104 and 204 so as to be driven by the one or more processors 102 and 202. The functions, procedures, proposals, and/or methods disclosed in this document may be implemented using firmware or software in the form of code, commands, and/or a set of commands.

The one or more memories 104 and 204 may be connected to the one or more processors 102 and 202 and store various types of data, signals, messages, information, programs, code, commands, and/or instructions. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208. The one or more transceivers 106 and 206 may be configured to transmit and receive user data, control information, and/or radio signals/channels, mentioned in the functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 3:
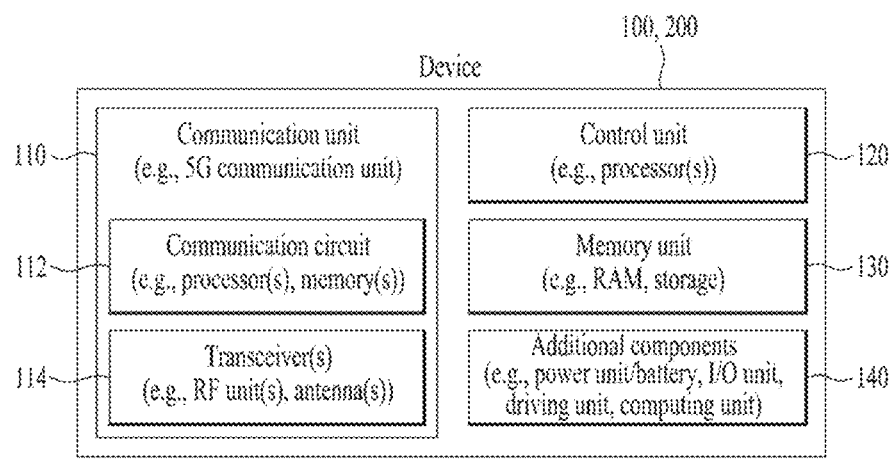
FIG. 3 illustrates another example of a wireless device capable of performing implementation(s) of the present disclosure.

FIG. 3 illustrates another example of a wireless device capable of performing implementation(s) of the present disclosure. Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 2. For example, the transceiver(s) 114 may include the one or more transceivers 106 and 206 and/or the one or more antennas 108 and 208 of FIG. 2. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast UE, a hologram device, a public safety device, an MTC device, a medicine device, a fintech device (or a finance device), a security device, a climate/environment device, the AI server/device (400 of FIG. 1), the BS (200 of FIG. 1), a network node, etc. The wireless device may be used in a mobile or fixed place according to a use-case/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an electronic control unit (ECU), a graphical processing unit, and a memory control processor. As another example, the memory 130 may be configured by a random access memory (RAM), a dynamic RAM (DRAM), a read-only memory (ROM)), a flash memory, a volatile memory, a non-volatile memory, and/or a combination thereof.

In the present disclosure, at least one memory (e.g., 104 or 204) may store instructions or programs which, when executed, cause at least one processor operably coupled to the at least one memory to perform operations according to some embodiments or implementations of the present disclosure.

In the present disclosure, a computer-readable storage medium may store at least one instruction or computer program which, when executed by at least one processor, causes the at least one processor to perform operations according to some embodiments or implementations of the present disclosure.

In the present disclosure, a processing device or apparatus may include at least one processor and at least one computer memory coupled to the at least one memory. The at least one computer memory may store instructions or programs which, when executed, cause the at least one processor operably coupled to the at least one memory to perform operations according to some embodiments or implementations of the present disclosure.

Figure 4:
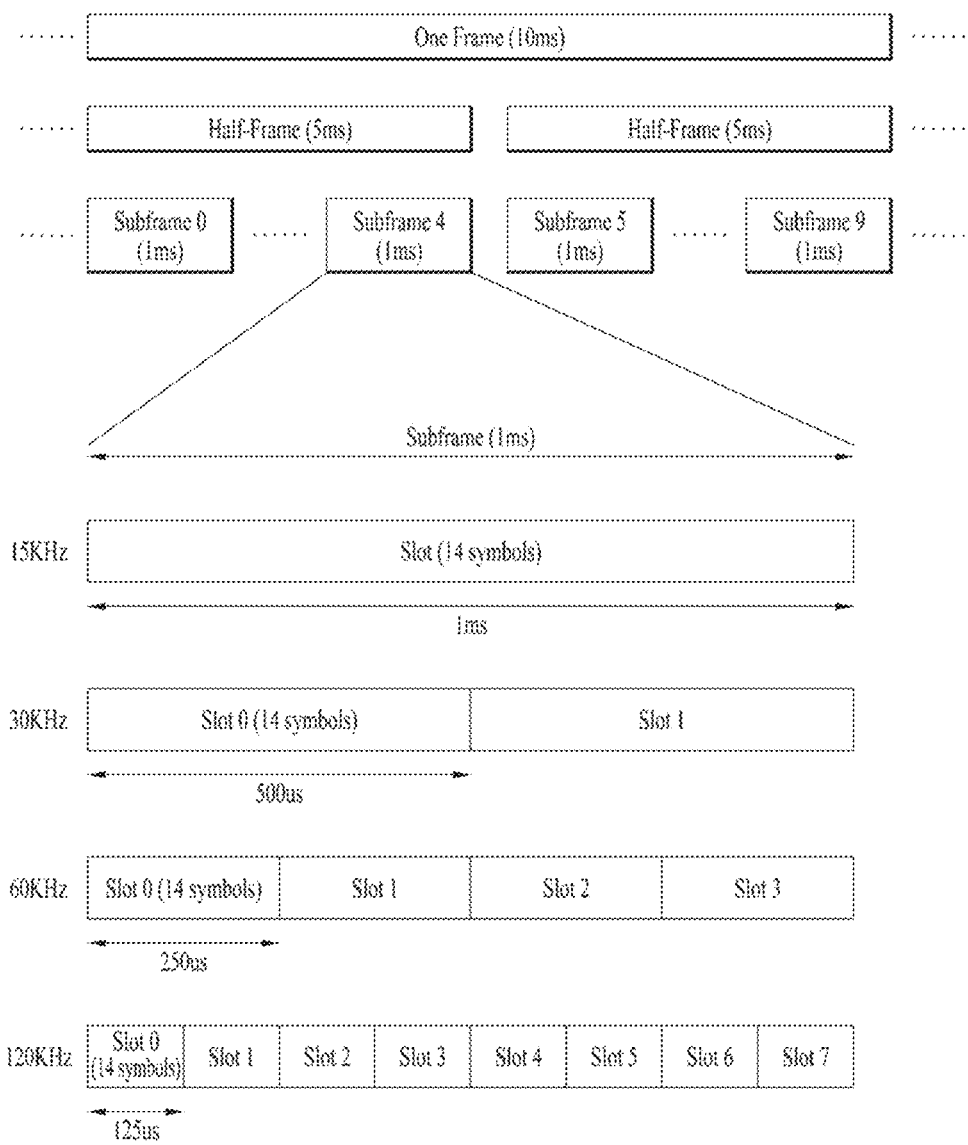
FIG. 4 illustrates an example of a frame structure used in a 3rd generation partnership project (3GPP)-based wireless communication system.

FIG. 4 illustrates an example of a frame structure used in a 3GPP-based wireless communication system.

The frame structure of FIG. 4 is purely exemplary and the number of subframes, the number of slots, and the number of symbols, in a frame, may be variously changed. In an NR system, different OFDM numerologies (e.g., subcarrier spacings (SCSs)) may be configured for multiple cells which are aggregated for one UE. Accordingly, the (absolute time) duration of a time resource including the same number of symbols (e.g., a subframe, a slot, or a transmission time interval (TTI)) may be differently configured for the aggregated cells. Here, the symbol may include an OFDM symbol (or cyclic prefix-OFDM (CP-OFDM) symbol) and an SC-FDMA symbol (or discrete Fourier transform-spread-OFDM (DFT-s-OFDM) symbol). In the present disclosure, the symbol, the OFDM-based symbol, the OFDM symbol, the CP-OFDM symbol, and the DFT-s-OFDM symbol are used interchangeably Referring to FIG. 4, in the NR system, UL and DL transmissions are organized into frames. Each frame has a duration of $T_f$=10 ms and is divided into two half-frames of 5 ms each. Each half-frame includes 5 subframes and a duration $T_{sf}$ of a single subframe is 1 ms. Subframes are further divided into slots and the number of slots in a subframe depends on a subcarrier spacing. Each slot includes 14 or 12 OFDM symbols based on a cyclic prefix. In a normal CP, each slot includes 14 OFDM symbols and, in an extended CP, each slot includes 12 OFDM symbols. The numerology depends on an exponentially scalable sub-carrier spacing $\Delta f=2^u*15$ kHz. The table below shows the number of OFDM symbols ($N^{slot}_{symb}$) per slot, the number of slots ($N^{frame,u}_{slot}$) per frame, and the number of slots ($N^{subframe,u}_{slot}$) per subframe.

TABLE 1

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

The table below shows the number of OFDM symbols per slot, the number of slots per frame, and the number of slots per subframe, according to the subcarrier spacing $\Delta f=2^1*15$ kHz.

TABLE 2

| u | $N^{slot}_{symb}$ | $N^{frame,u}_{slot}$ | $N^{subframe,u}_{slot}$ |
|---|---|---|---|
| 2 | 12 | 40 | 4 |

Figure 5:
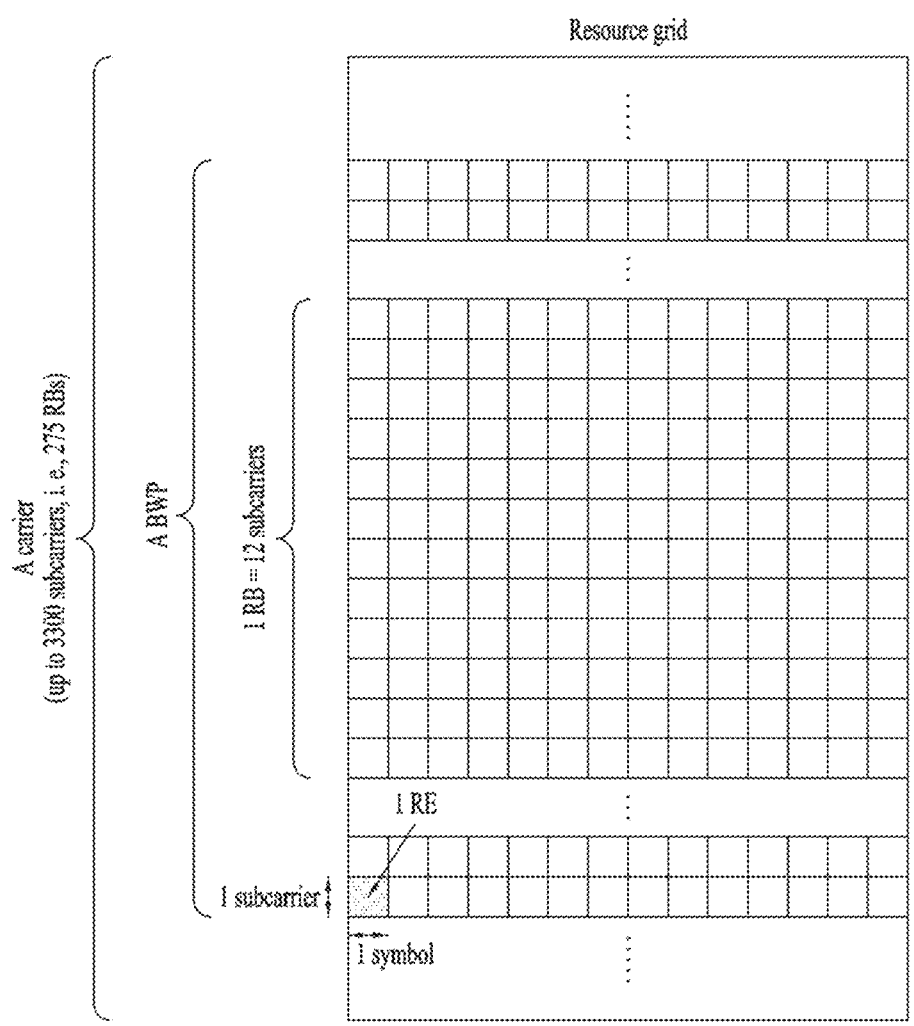
FIG. 5 illustrates a resource grid of a slot.

FIG. 5 illustrates a resource grid of a slot. The slot includes multiple (e.g., 14 or 12) symbols in the time domain. For each numerology (e.g., subcarrier spacing) and carrier, a resource grid of $N^{size,u}_{grid,x}*N^{RB}_{sc}$ subcarriers and Nzsubframe,$u_{symb}$ OFDM symbols is defined, starting at a common resource block (CRB) $N^{start,u}_{grid}$ indicated by higher layer signaling (e.g. RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP-based wireless communication system, $N^{RB}_{sc}$ is typically 12. There is one resource grid for a given antenna port p, a subcarrier spacing configuration u, and a transmission link (DL or UL). The carrier bandwidth $N^{size,u}_{grid}$ for the subcarrier spacing configuration u is given to the UE by a higher layer parameter (e.g. RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index/representing a symbol location relative to a reference point in the time domain.

In the NR system, an RB is defined by 12 consecutive subcarriers in the frequency domain. In the NR system, RBs are classified into CRBs and physical resource blocks (PRBs). The CRBs are numbered from 0 upwards in the frequency domain for the subcarrier spacing configuration u. The center of subcarrier 0 of CRB 0 for the subcarrier spacing configuration u is equal to 'Point A' which serves as a common reference point for RB grids. The PRBs are defined within a bandwidth part (BWP) and numbered from 0 to $N^{size}_{BWP,i}-1$, where i is a number of the BWP. The relation between a PRB $n_{PRB}$ in a BWP i and a CRB $n_{CRB}$ is given by: $n_{PRB}=n_{CRB}+N^{size}_{BWP,i}$, where $N^{size}_{BWP,i}$ is a CRB in which the BWP starts relative to CRB 0. The BWP includes a plurality of consecutive RBs in the frequency domain. A carrier may include a maximum of N (e.g., 5) BWPs. The UE may be configured to have one or more BWPs on a given component carrier. Data communication is performed through an activated BWP and only a predetermined number of BWPs (e.g., one BWP) among BWPs configured for the UE may be active on the component carrier.

Figure 6:
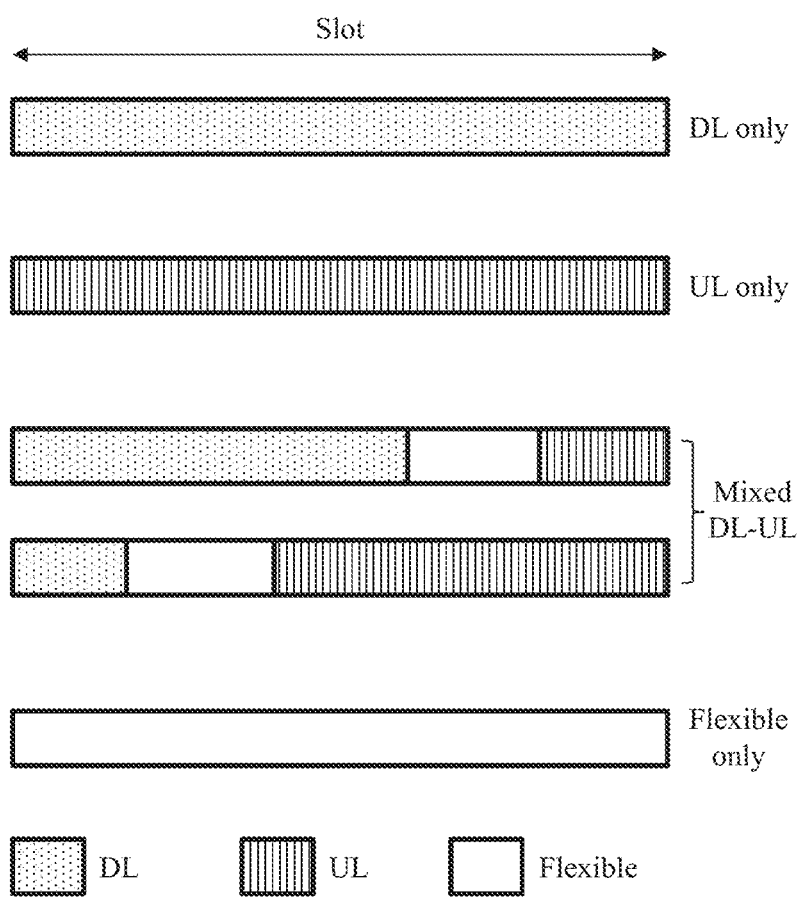
FIG. 6 is a diagram illustrating exemplary slot structures which may be used in the 3GPP-based system.

The UE for which carrier aggregation is configured may be configured to use one or more cells. If the UE is configured with a plurality of serving cells, the UE may be configured with one or multiple cell groups. The UE may also be configured with a plurality of cell groups associated with different BSs. Alternatively, the UE may be configured with a plurality of cell groups associated with a single BS. Each cell group of the UE includes one or more serving cells and includes a single PUCCH cell for which PUCCH resources are configured. The PUCCH cell may be a Pcell or an Scell configured as the PUCCH cell among Scells of a corresponding cell group. Each serving cell of the UE belongs to one of cell groups of the UE and does not belong to a plurality of cell FIG. 6 is a diagram illustrating exemplary slot structures which may be used in the 3GPP-based system. In every 3GPP-based system, for example, the NR system, each slot may have a self-contained structure with i) a DL control channel, ii) DL or UL data, and/or iii) a UL control channel. For example, the first N symbols of a slot may be used to deliver a DL control channel (hereinafter, referred to as a DL control region), and the last M symbols of the slot may be used to deliver a UL control channel (hereinafter, referred to as a UL control region). Each of N and M is 0 or a positive integer. A resource region (hereinafter, referred to as a data region) between the DL control region and the UL control region may be used to deliver DL data or UL data. The symbols of a single slot may be divided into group(s) of consecutive symbols available as DL symbols, UL symbols, or flexible symbols. Hereinbelow, information specifying the usages of symbols in a slot is referred to as a slot format. For example, a slot format may define which symbols are to be used for UL and which symbols are to be used for DL.

When a serving cell is to be operated in a TDD mode, the BS may configure a UL and DL allocation pattern for the serving cell by higher-layer signaling (e.g., RRC signaling). For example, the following parameters may be used to configure a TDD DL-UL pattern:
- dl-UL-TransmissionPeriodicity indicating the periodicity of a DL-UL pattern;
- nrofDownlinkSlots indicating the number of consecutive full DL slots at the beginning of each DL-UL pattern, where a full DL slot is a slot including DL symbols only;
- nrofDownlinkSymbols indicating the number consecutive DL symbols at the beginning of the slot following the last full DL slot;
- nrofUplinkSlots indicating the number of consecutive full UL slots at the end of each DL-UL pattern, where a full UL slot is a slot including UL symbols only; and
- nrofUplinkSymbols indicating the number of consecutive UL symbols at the end of the slot preceding the first full UL slot.

The remaining symbols configured neither as DL nor as UL among the symbols of the DL-UL pattern are flexible symbols.

Upon receipt of a configuration for a TDD DL-UL pattern, that is, a TDD UL-DL configuration (e.g., tdd-UL-DL-ConfigurationCommon or tdd-UL-DLConfigurationDedicated) by higher-layer signaling, the UE sets a slot format for each slot across the slots.

Although various combinations may be produced out of DL symbols, UL symbols, and flexible symbols, a specific number of combinations may be predefined as slot formats, and the predefined slot formats may be identified by slot format indexes. The following table lists some of the predefined slot formats. In the table, D denotes DL symbol, U denotes UL symbol, and F denotes flexible symbol.

TABLE 3

| Format | Symbol number in a slot | | | | | | | | | | | | |
|---|---|---|---|---|---|---|---|---|---|---|---|---|---|
| | 0 | 1 | 2 | 3 | 4 | 5 | 6 | 7 | 9 | 10 | 11 | 12 | 13 |
| 0 | D | D | D | D | D | D | D | D | D | D | D | D | D |
| 1 | U | U | U | U | U | U | U | U | U | U | U | U | U |
| 2 | F | F | F | F | F | F | F | F | F | F | F | F | F |
| 3 | D | D | D | D | D | D | D | D | D | D | D | D | F |
| 4 | D | D | D | D | D | D | D | D | D | D | D | F | F |
| 5 | D | D | D | D | D | D | D | D | D | F | F | F | F |
| 6 | D | D | D | D | D | D | D | D | F | F | F | F | F |
| 7 | D | D | D | D | D | D | D | F | F | F | F | F | F |
| 8 | F | F | F | F | F | F | F | F | F | F | F | F | U |
| 9 | F | F | F | F | F | F | F | F | F | F | F | U | U |
| 10 | F | U | U | U | U | U | U | U | U | U | U | U | U |
| 11 | F | F | U | U | U | U | U | U | U | U | U | U | U |
| 12 | F | F | F | U | U | U | U | U | U | U | U | U | U |
| 13 | F | F | F | F | U | U | U | U | U | U | U | U | U |
| 14 | F | F | F | F | F | U | U | U | U | U | U | U | U |
| 15 | F | F | F | F | F | F | U | U | U | U | U | U | U |
| 16 | D | F | F | F | F | F | F | F | F | F | F | F | F |
| 17 | D | D | F | F | F | F | F | F | F | F | F | F | F |
| 18 | D | D | D | F | F | F | F | F | F | F | F | F | F |
| 19 | D | F | F | F | F | F | F | F | F | F | F | F | U |
| 20 | D | D | F | F | F | F | F | F | F | F | F | F | U |
| ... | | | | | ... | | | | | | | | |

To indicate which one of the predefined slot formats to be used for a specific slot, the BS may configure a set of slot format combinations available for each serving cell in a set of serving cells by higher-layer signaling (e.g., RRC signaling), and configure the UE to monitor a group-common PDCCH for slot format indicator(s) (SFI(s)) by higher-layer signaling (e.g., RRC signaling). DCI carried on the group-common PDCCH for the SFI(s) is referred to as SFI DCI. DCI format 2_0 is used for the SFI DCI. For example, for each serving cell in a set of serving cells, the BS may provide the UE with the (starting) position of a slot format combination ID (i.e., SFI-index) for the serving cell, a set of slot format combinations applicable to the serving cell, and a reference SCS configuration for each slot format in a slot format combination indicated by an SFI-index value in the SFI DCI. For each slot format combination in the set of slot format combinations, one or more slot formats are configured and a slot format combination ID (i.e., SFI-index) is assigned. For example, when the BS is to configure a slot format combination with N slot formats, the BS may indicate N ones of slot format indexes for the predefined slot formats (e.g., refer to Table 3) for the slot format combination. To configure the UE to monitor the group-common PDCCH for SFIs, the BS indicates an RNTI used for SFIs, SFI-RNTI and the total length of DCI payload scrambled with the SFI-RNTI to the UE. Upon detection of a PDCCH based on the SFI-RNTI, the UE may determine slot format(s) for a corresponding serving cell from an SFI-index for the serving cell among SFI-indexes in DCI payload of the PDCCH.

Symbols indicated as flexible by a TDD DL-UL pattern configuration may be indicated as UL, DL, or flexible by SFI DCI. Symbols indicated as DL/UL by the TDD DL-UL pattern configuration are not overridden as UL/DL or flexible by the SFI DCI.

When the UE is not configured with a TDD DL-UL pattern, the UE determines for each slot whether the slot is for UL or DL, and symbols allocation in the slot based on SFI DCI and/or DCI that schedules or triggers a DL or UL signal transmission (e.g., DCI format 10, DCI format 1_1, DCI format 1_2, DCI format 0_0, DCI format 0_1, DCI format 0_2, and DCI format 2_3).

Hereinafter, physical channels that may be used in the 3GPP-based wireless communication system will be described in detail.

A PDCCH carries DCI. For example, the PDCCH (i.e., DCI) carries information about transport format and resource allocation of a downlink shared channel (DL-SCH), information about resource allocation of an uplink shared channel (UL-SCH), paging information about a paging channel (PCH), system information about the DL-SCH, information about resource allocation for a control message, such as a random access response (RAR) transmitted on a PDSCH, of a layer (hereinafter, higher layer) positioned higher than a physical layer among protocol stacks of the UE/BS, a transmit power control command, information about activation/release of configured scheduling (CS), etc. The DCI includes a cyclic redundancy check (CRC). The CRC is masked/scrambled with various identifiers (e.g., radio network temporary identifier (RNTI)) according to an owner or usage of the PDCCH. For example, if the PDCCH is for a specific UE, the CRS is masked with a UE identifier (e.g., cell-RNTI (C-RNTI)). If the PDCCH is for a paging message, the CRC is masked with a paging RNTI (P-RNTI). If the PDCCH is for system information (e.g., system information block (SIB)), the CRC is masked with a system information RNTI (SI-RNTI). If the PDCCH is for a random access response, the CRC is masked with a random access-RNTI (RA-RNTI).

A PDCCH is transmitted through a control resource set (CORESET). One or more CORESETs may be configured for the UE. The CORESET consists of a set of PRBs with a duration of 1 to 3 OFDM symbols. The PRBs and a CORESET duration that constitute the CORESET may be provided to the UE through higher layer (e.g., RRC) signaling. A set of PDCCH candidates in the configured CORESET(s) is monitored according to corresponding search space sets. In the present disclosure, monitoring implies decoding (called blind decoding) each PDCCH candidate according to monitored DCI formats. The set of the PDCCH candidates that the UE monitors is defined in terms of PDCCH search space sets. The search space sets may be common search space (CSS) sets or UE-specific search space (USS) sets. Each CORESET configuration is associated with one or more search space sets and each search space set is associated with one CORESET configuration. The search space set is determined based on the following parameters provided by the BS to the UE.

controlResourceSetId: Identifies a CORESET related to a search space set.
monitoringSlotPeriodicityAndOffset: Indicates slots for PDCCH monitoring configured as a periodicity and an offset.
monitoringSymbolsWithinSlot: Indicates the first symbol(s) for PDCCH monitoring in the slots for PDCCH monitoring.
nrofCandidates: Indicates the number of PDCCH candidates for each CCE aggregation level.

A PDSCH is a physical layer UL channel for UL data transport. The PDSCH carries DL data (e.g., DL-SCH transport block) and is subjected to modulation such as quadrature phase shift keying (QPSK), 16 quadrature amplitude modulation (QAM), 64 QAM, 256 QAM, etc. A codeword is generated by encoding a transport block (TB). The PDSCH may carry a maximum of two codewords. Scrambling and modulation mapping per codeword may be performed and modulation symbols generated from each codeword may be mapped to one or more layers. Each layer is mapped to a radio resource together with a DMRS and generated as an OFDM symbol signal. Then, the OFDM symbol signal is transmitted through a corresponding antenna port.

A PUCCH means a physical layer UL channel for UCI transmission. The PUCCH carries UCI. The UCI includes the following information.

Scheduling request (SR): Information that is used to request a UL-SCH resource.
Hybrid automatic repeat request (HARQ)—acknowledgment (ACK): A response to a DL data packet (e.g., codeword) on the PDSCH. HARQ-ACK indicates whether the DL data packet has been successfully received by a communication device. In response to a single codeword, 1-bit HARQ-ACK may be transmitted. In response to two codewords, 2-bit HARQ-ACK may be transmitted. The HARQ-ACK response includes positive ACK (simply, ACK), negative ACK (NACK), discontinuous transmission (DTX), or NACK/DTX. Here, the term HARQ-ACK is used interchangeably with HARQ ACK/NACK, ACK/NACK, or A/N.
Channel state information (CSI): Feedback information about a DL channel. The CSI may include channel quality information (CQI), a rank indicator (RI), a precoding matrix indicator (PMI), a CSI-RS resource indicator (CSI), an SS/PBCH resource block indicator (SSBRI), and a layer indicator (LI). The CSI may be classified into CSI part 1 and CSI part 2 according to UCI type included in the CSI. For example, the CRI, RI, and/or the CQI for the first codeword may be included in CSI part 1, and LI, PMI, and/or the CQI for the second codeword may be included in CSI part 2.

In the present disclosure, for convenience, PUCCH resources configured/indicated for/to the UE by the BS for HARQ-ACK, SR, and CSI transmission are referred to as an HARQ-ACK PUCCH resource, an SR PUCCH resource, and a CSI PUCCH resource, respectively.

PUCCH formats may be defined as follows according to UCI payload sizes and/or transmission lengths (e.g., the number of symbols included in PUCCH resources). In regard to the PUCCH formats, reference may also be made to Table 4.

(0) PUCCH Format 0 (PF0 or F0)
Supported UCI payload size: up to K bits (e.g., K=2)
Number of OFDM symbols constituting a single PUCCH: 1 to X symbols (e.g., X=2)
Transmission structure: Only a UCI signal without a DMRS is included in PUCCH format 0. The UE transmits a UCI state by selecting and transmitting one of a plurality of sequences. For example, the UE transmits specific UCI to the BS by transmitting one of a plurality of sequences through a PUCCH, which is PUCCH format 0. The UE transmits the PUCCH, which is PUCCH format 0, in PUCCH resources for a corresponding SR configuration only upon transmitting a positive SR.
Configuration for PUCCH format 0 includes the following parameters for a corresponding PUCCH resource: an index for initial cyclic shift, the number of symbols for PUCCH transmission, and/or the first symbol for PUCCH transmission.

(1) PUCCH Format 1 (PF1 or F1)
Supported UCI payload size: up to K bits (e.g., K=2)
Number of OFDM symbols constituting a single PUCCH: Y to Z symbols (e.g., Y=4 and Z=14)
Transmission structure: The DMRS and UCI are configured/mapped in TDM in/to different OFDM symbols.

In other words, the DMRS is transmitted in symbols in which modulation symbols are not transmitted and the UCI is represented as the product between a specific sequence (e.g., orthogonal cover code (OCC)) and a modulation (e.g., QPSK) symbol. Code division multiplexing (CDM) is supported between a plurality of PUCCH resources (conforming to PUCCH format 1) (within the same RB) by applying cyclic shifts (CSs)/OCCs to both the UCI and the DMRS. PUCCH format 1 carries the UCI of up to 2 bits and the modulation symbols are spread by the OCC (differently configured depending on whether frequency hopping is performed) in the time domain.

Configuration for PUCCH format 1 includes the following parameters for a corresponding PUCCH resource: an index for initial cyclic shift, the number of symbols for PUCCH transmission, the first symbol for PUCCH transmission, and/or an index for the OCC.

(2) PUCCH Format 2 (PF2 or F2)

Supported UCI payload size: more than K bits (e.g., K=2)

Number of OFDM symbols constituting a single PUCCH: 1 to X symbols (e.g., X=2)

Transmission structure: The DMRS and UCI are configured/mapped using frequency division multiplexing (FDM) within the same symbol. The UE transmits the UCI by applying only IFFT without DFT to encoded UCI bits. PUCCH format 2 carries UCI of a larger bit size than K bits and modulation symbols are subjected to FDM with the DMRS, for transmission. For example, the DMRS is located in symbol indexes #1, #4, #7, and #10 within a given RB with the density of 1/3. A pseudo noise (PN) sequence is used for a DMRS sequence. Frequency hopping may be activated for 2-symbol PUCCH format 2.

Configuration for PUCCH format 2 includes the following parameters for a corresponding PUCCH resource: the number of PRBs, the number of symbols for PUCCH transmission, and/or the first symbol for PUCCH transmission.

(3) PUCCH Format 3 (PF3 or F3)

Supported UCI payload size: more than K bits (e.g., K=2)

Number of OFDM symbols constituting a single PUCCH: Y to Z symbols (e.g., Y=4 and Z=14)

Transmission structure: The DMRS and UCI are configured/mapped in TDM for/to different OFDM symbols. The UE transmits the UCI by applying DFT to encoded UCI bits. PUCCH format 3 does not support UE multiplexing for the same time-frequency resource (e.g., same PRB).

Configuration for PUCCH format 3 includes the following parameters for a corresponding PUCCH resource: the number of PRBs, the number of symbols for PUCCH transmission, and/or the first symbol for PUCCH transmission.

(4) PUCCH Format 4 (PF4 or F4)

Supported UCI payload size: more than K bits (e.g., K=2)

Number of OFDM symbols constituting a single PUCCH: Y to Z symbols (e.g., Y=4 and Z=14)

Transmission structure: The DMRS and UCI are configured/mapped in TDM for/to different OFDM symbols. PUCCH format 4 may multiplex up to 4 UEs in the same PRB, by applying an OCC at the front end of DFT and applying a CS (or interleaved FDM (IFDM) mapping) to the DMRS. In other words, modulation symbols of the UCI are subjected to TDM with the DMRS, for transmission.

Configuration for PUCCH format 4 includes the following parameters for a corresponding PUCCH resource: the number of symbols for PUCCH transmission, length for the OCC, an index for the OCC, and the first symbol for PUCCH transmission.

The table below shows the PUCCH formats. The PUCCH formats may be divided into short PUCCH formats (formats 0 and 2) and long PUCCH formats (formats 1, 3, and 4) according to PUCCH transmission length.

TABLE 4

| PUCCH format | Length in OFDM symbols $N^{PUCCH}_{symb}$ | Number of bits | Usage | Etc. |
| --- | --- | --- | --- | --- |
| 0 | 1-2 | =<2 | HARQ, SR | Sequence selection |
| 1 | 4-14 | =<2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

A PUCCH resource may be determined according to a UCI type (e.g., A/N, SR, or CSI). A PUCCH resource used for UCI transmission may be determined based on a UCI (payload) size. For example, the BS may configure a plurality of PUCCH resource sets for the UE, and the UE may select a specific PUCCH resource set corresponding to a specific range according to the range of the UCI (payload) size (e.g., numbers of UCI bits). For example, the UE may select one of the following PUCCH resource sets according to the number of UCI bits, $N_{UCI}$.

PUCCH resource set #0, if the number of UCI bits=<2

PUCCH resource set #1, if 2<the number of UCI bits=<$N_1$

PUCCH resource set #(K−1), if $N_{K-2}$<the number of UCI bits=<$N_{K-1}$

Here, K represents the number of PUCCH resource sets (K>1) and $N_i$ represents a maximum number of UCI bits supported by PUCCH resource set #i. For example, PUCCH resource set #1 may include resources of PUCCH formats 0 to 1, and the other PUCCH resource sets may include resources of PUCCH formats 2 to 4 (see Table 4).

Configuration for each PUCCH resource includes a PUCCH resource index, a start PRB index, and configuration for one of PUCCH format 0 to PUCCH format 4. The UE is configured with a code rate for multiplexing HARQ-ACK, SR, and CSI report(s) within PUCCH transmission using PUCCH format 2, PUCCH format 3, or PUCCH format 4, by the BS through a higher layer parameter maxCodeRate. The higher layer parameter maxCodeRate is used to determine how to feed back the UCI on PUCCH resources for PUCCH format 2, 3, or 4.

If the UCI type is SR and CSI, a PUCCH resource to be used for UCI transmission in a PUCCH resource set may be configured for the UE through higher layer signaling (e.g., RRC signaling). If the UCI type is HARQ-ACK for a semi-persistent scheduling (SPS) PDSCH, the PUCCH resource to be used for UCI transmission in the PUCCH resource set may be configured for the UE through higher layer signaling (e.g., RRC signaling). On the other hand, if the UCI type is HARQ-ACK for a PDSCH scheduled by DCI, the PUCCH resource to be used for UCI transmission in the PUCCH resource set may be scheduled by the DCI.

In the case of DCI-based PUCCH resource scheduling, the BS may transmit the DCI to the UE on a PDCCH and indicate a PUCCH resource to be used for UCI transmission in a specific PUCCH resource set by an ACK/NACK resource indicator (ARI) in the DCI. The ARI may be used to indicate a PUCCH resource for ACK/NACK transmission and also be referred to as a PUCCH resource indicator (PRI). Here, the DCI may be used for PDSCH scheduling and the UCI may include HARQ-ACK for a PDSCH. The BS may configure a PUCCH resource set including a larger number of PUCCH resources than states representable by the ARI by (UE-specific) higher layer (e.g., RRC) signaling for the UE. The ARI may indicate a PUCCH resource subset of the PUCCH resource set and which PUCCH resource in the indicated PUCCH resource subset is to be used may be determined according to an implicit rule based on transmission resource information about the PDCCH (e.g., the starting CCE index of the PDCCH).

The PUSCH delivers UL data (e.g., UL-SCH TB) and/or UCI and is transmitted based on a CP-OFDM waveform or a DFT-s-OFDM waveform. When the PUSCH is transmitted based on the DFT-s-OFDM waveform, the UE transmits the PUSCH by applying transform precoding. For example, when transform precoding is impossible (e.g., transform precoding is disabled), the UE transmits the PUSCH based on the CP-OFDM waveform, and when transform precoding is possible (e.g., transform precoding is enabled), the UE transmits the PUSCH based on the CP-OFDM waveform or the DFT-s-OFDM waveform. The PUSCH transmission may be scheduled dynamically by a UL grant in DCI or semi-statically by higher-layer (e.g., RRC) signaling (and/or layer 1 (L1) signaling (e.g., PDCCH)). A resource assignment scheduled semi-statically by higher-layer (e.g., RRC) signaling (and/or L1 (i.e., PHY) signaling) is referred to as a configured grant. The PUSCH transmission may be performed in a codebook-based or non-codebook-based manner.

For UL-SCH data transmission, the UE should include UL resources available for the UE and, for DL-SCH data reception, the UE should include DL resources available for the UE. The UL resources and the DL resources are assigned to the UE by the BS through resource allocation. Resource allocation may include time domain resource allocation (TDRA) and frequency domain resource allocation (FDRA). In the present disclosure, UL resource allocation is also referred to as a UL grant and DL resource allocation is referred to as DL assignment. The UL grant is dynamically received by the UE on the PDCCH or in RAR or semi-persistently configured for the UE by the BS through RRC signaling. DL assignment is dynamically received by the UE on the PDCCH or semi-persistently configured for the UE by the BS through RRC signaling.

On UL, the BS may dynamically allocate UL resources to the UE through PDCCH(s) addressed to a cell radio network temporary Identifier (C-RNTI). The UE monitors the PDCCH(s) in order to discover possible UL grant(s) for UL transmission. The BS may allocate the UL resources using a configured grant to the UE. Two types of configured grants, Type 1 and Type 2, may be used. In Type 1, the BS directly provides the configured UL grant (including periodicity) through RRC signaling. In Type 2, the BS may configure a periodicity of an RRC-configured UL grant through RRC signaling and signal, activate, or deactivate the configured UL grant through the PDCCH addressed to a configured scheduling RNTI (CS-RNTI). For example, in Type 2, the PDCCH addressed to the CS-RNTI indicates that the corresponding UL grant may be implicitly reused according to the configured periodicity through RRC signaling until deactivation.

On DL, the BS may dynamically allocate DL resources to the UE through PDCCH(s) addressed to the C-RNTI. The UE monitors the PDCCH(s) in order to discover possible DL grant(s). The BS may allocate the DL resources to the UE using SPS. The BS may configure a periodicity of configured DL assignment through RRC signaling and signal, activate, or deactivate the configured DL assignment through the PDCCH addressed to the CS-RNTI. For example, the PDCCH addressed to the CS-RNTI indicates that the corresponding DL assignment may be implicitly reused according to the configured periodicity through RRC signaling until deactivation.

Hereinafter, resource allocation by the PDCCH and resource allocation by RRC will be described in more detail. Resource Allocation by PDCCH: Dynamic Grant/Assignment The PDCCH may be used to schedule DL transmission on the PDSCH and UL transmission on the PUSCH. DCI on the PDCCH for scheduling DL transmission may include DL resource assignment that at least includes a modulation and coding format (e.g., modulation and coding scheme (MCS)) index IMcs), resource allocation, and HARQ information, associated with a DL-SCH. DCI on the PDCCH for scheduling UL transmission may include a UL scheduling grant that at least includes a modulation and coding format, resource allocation, and HARQ information, associated with a UL-SCH. The size and usage of the DCI carried by one PDCCH differs according to a DCI format. For example, DCI format 0_0, DCI format 01, or DCI format 0_2 may be used to schedule the PUSCH, and DCI format 1_0, DCI format 11, or DCI format 1_2 may be used to schedule the PDSCH. Particularly, DCI format 0_2 and DCI format 1_2 may be used to schedule transmission having higher transmission reliability and lower latency requirements than transmission reliability and latency requirement guaranteed by DCI format 0_0, DCI format 0_1, DCI format 1_0, or DCI format 1_1. Some implementations of the present disclosure may be applied to UL data transmission based on DCL format 0_2. Some implementations of the present disclosure may be applied to DL data reception based on DCI format 1_2.

Figure 7:
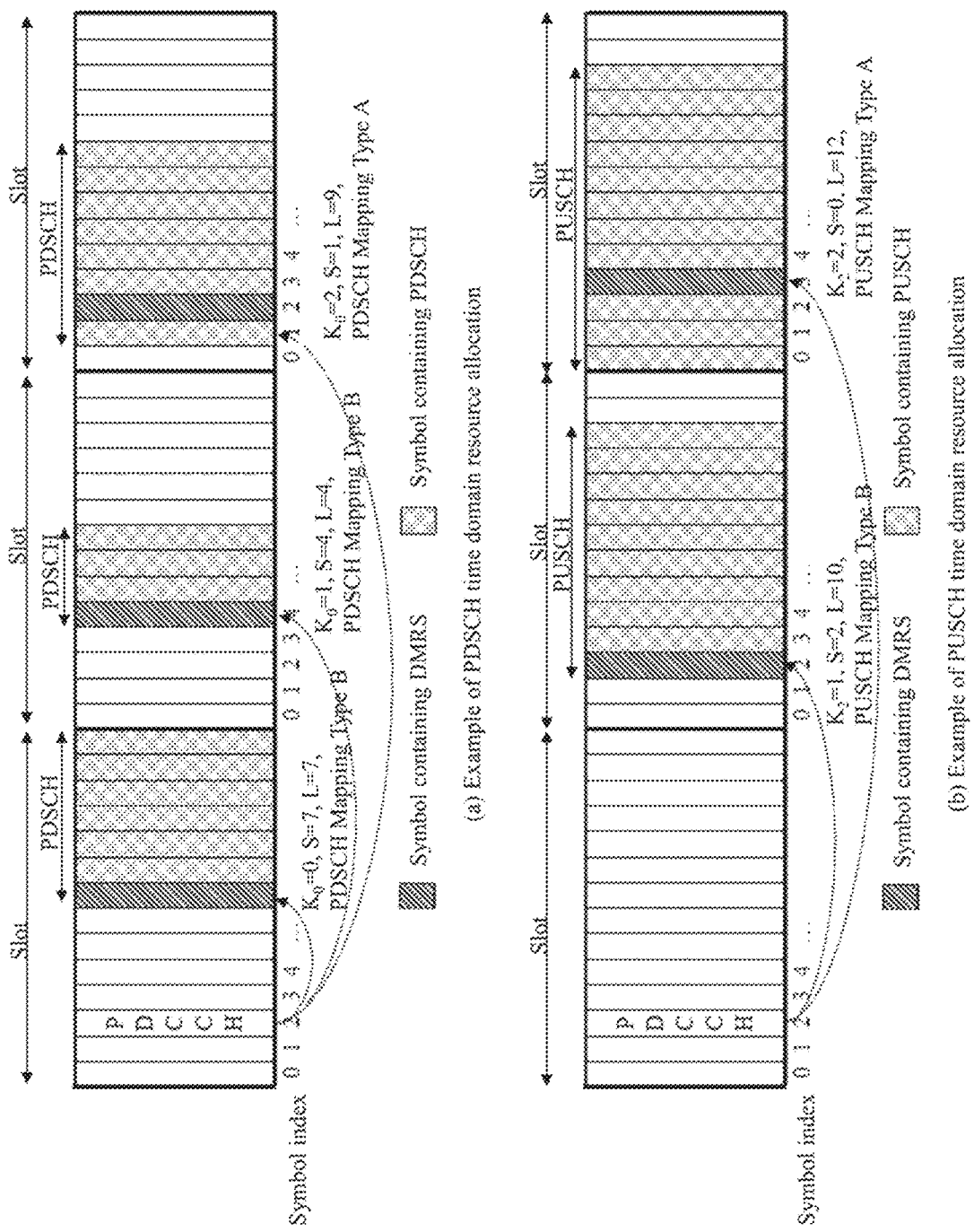
FIG. 7 is a diagram illustrating an example of physical downlink shared channel (PDSCH) time-domain resource allocation based on a PDCCH and an example of physical uplink shared channel (PUSCH) time-domain resource allocated based on a PDCCH.

FIG. 7 illustrates an example of PDSCH TDRA caused by a PDCCH and an example of PUSCH TDRA caused by the PDCCH.

DCI carried by the PDCCH in order to schedule a PDSCH or a PUSCH includes a TDRA field. The TDRA field provides a value m for a row index m+1 to an allocation table for the PDSCH or the PUSCH. Predefined default PDSCH time domain allocation is applied as the allocation table for the PDSCH or a PDSCH TDRA table that the BS configures through RRC signaled pdsch-TimeDomainAllocationList is applied as the allocation table for the PDSCH. Predefined default PUSCH time domain allocation is applied as the allocation table for the PDSCH or a PUSCH TDRA table that the BS configures through RRC signaled pusch-TimeDomainAllocationList is applied as the allocation table for the PUSCH. The PDSCH TDRA table to be applied and/or the PUSCH TDRA table to be applied may be determined according a fixed/predefined rule (e.g., refer to 3GPP TS 38.214).

In PDSCH time domain resource configurations, each indexed row defines a DL assignment-to-PDSCH slot offset $K_0$, a start and length indicator SLIV (or directly, a start position (e.g., start symbol index S) and an allocation length (e.g., the number of symbols, L) of the PDSCH in a slot), and a PDSCH mapping type. In PUSCH time domain resource configurations, each indexed row defines a UL grant-to-PUSCH slot offset $K_2$, a start position (e.g., start symbol index S) and an allocation length (e.g., the number of symbols, L) of the PUSCH in a slot, and a PUSCH mapping type. $K_0$ for the PDSCH and $K_2$ for the PUSCH indicate the difference between the slot with the PDCCH and the slot with the PDSCH or PUSCH corresponding to the PDCCH. SLIV denotes a joint indicator of the start symbol S relative to the start of the slot with the PDSCH or PUSCH and the number of consecutive symbols, L, counting from the symbol S. The PDSCH/PUSCH mapping type includes two mapping types: one is mapping Type A and the other is mapping Type B. In PDSCH/PUSCH mapping Type A, a demodulation reference signal (DMRS) is located in the third symbol (symbol #2) or fourth symbol (symbol #3) in a slot according to RRC signaling. In PDSCH/PUSCH mapping Type B, the DMRS is located in the first symbol allocated for the PDSCH/PUSCH.

The scheduling DCI includes an FDRA field that provides assignment information about RBs used for the PDSCH or the PUSCH. For example, the FDRA field provides information about a cell for PDSCH or PUSCCH transmission to the UE, information about a BWP for PDSCH or PUSCH transmission, and/or information about RBs for PDSCH or PUSCH transmission.

Resource Allocation by RRC

As mentioned above, there are two types of transmission without dynamic grant: configured grant Type 1 and configured grant Type 2. In configured grant Type 1, a UL grant is provided by RRC and stored as a configured UL grant. In configured grant Type 2, the UL grant is provided by the PDCCH and stored or cleared as the configured UL grant based on L1 signaling indicating configured UL grant activation or deactivation. Type 1 and Type 2 may be configured by RRC per serving cell and per BWP. Multiple configurations may be active simultaneously on different serving cells.

When configured grant Type 1 is configured, the UE may be provided with the following parameters through RRC signaling:
  cs-RNTI corresponding to a CS-RNTI for retransmission;
  periodicity corresponding to a periodicity of configured grant Type 1;
  timeDomainOffset indicating an offset of a resource with respect to system frame number (SFN)=0 in the time domain;
  timeDomainAllocation value m that provides a row index m+1 pointing to the allocation table, indicating a combination of the start symbol S, the length L, and the PUSCH mapping type;
  frequencyDomainAllocation that provides frequency domain resource allocation; and
  mcsAndTBS that provides IMCS indicating a modulation order, a target code rate, and a transport block size.

Upon configuration of configured grant Type 1 for a serving cell by RRC, the UE stores the UL grant provided by RRC as a configured UL grant for an indicated serving cell and initializes or re-initializes the configured UL grant to start in a symbol according to timeDomainOffset and S (derived from SLIV) and to recur with periodicity. After the UL grant is configured for configured grant Type 1, the UE may consider that the UL grant recurs in association with each symbol satisfying: [(SFN*numberOfSlotsPerFrame (numberOfSymbolsPerSlot)+(slot number in the frame*numberOfSymbolsPerSlot)+symbol number in the slot]=(timeDomainOffset*numberOfSymbolsPerSlot+S+N*periodicity) modulo (1024*numberOfSlotsPerFrame*numberOfSymbolsPerSlot), for all N>=0, where numberOfSlotsPerFrame and numberOfSymbolsPerSlot indicate the number of consecutive slots per frame and consecutive OFDM symbols per slot, respectively (refer to Table 1 and Table 2).

For configured grant Type 2, the UE may be provided with the following parameters by the BS through RRC signaling:
  cs-RNTI corresponding to a CS-RNTI for activation, deactivation, and retransmission; and
  periodicity that provides a periodicity of configured grant Type 2.

An actual UL grant is provided to the UE by the PDCCH (addressed to the CS-RNTI).

After the UL grant is configured for configured grant Type 2, the UE may consider that the UL grant recurs in association with each symbol satisfying: [(SFN*numberOfSlotsPerFrame*numberOfSymbolsPerSlot)+(slot number in the frame*numberOfSymbolsPerSlot)+symbol number in the slot]=[(SFNstart time*numberOfSlotsPerFrame*numberOfSymbolsPerSlot+ $slot_{start\ time}$*numberOfSymbolsPerSlot+symbolstart time)+N*periodicity] modulo (1024*numberOfSlotsPerFrame*numberOfSymbolsPerSlot), for all N>=0, where SFNstart time, $slot_{start\ time}$, and symbolstart time represent an SFN, a slot, and a symbol, respectively, of the first transmission opportunity of the PUSCH after the configured grant is (re-)initialized, and numberOfSlotsPerFrame and numberOfSymbolsPerSlot indicate the number of consecutive slots per frame and consecutive OFDM symbols per slot, respectively (refer to Table 1 and Table 2).

On DL, the UE may be configured with semi-persistent scheduling (SPS) per serving cell and per BWP by RRC signaling from the BS. For DL SPS, DL assignment is provided to the UE by the PDCCH and stored or cleared based on L1 signaling indicating SPS activation or deactivation. When SPS is configured, the UE may be provided with the following parameters by the BS through RRC signaling:
  cs-RNTI corresponding to a CS-RNTI for activation, deactivation, and retransmission;
  nrofHARQ-Processes that provides the number of HARQ processes for SPS;
  periodicity that provides a periodicity of configured DL assignment for SPS.

After DL assignment is configured for SPS, the UE may consider sequentially that N-th DL assignment occurs in a slot satisfying: (numberOfSlotsPerFrame*SFN+slot number in the frame)=[(numberOfSlotsPerFrame*SFNstart time+ $slot_{start\ time}$)+N*periodicity*numberOfSlotsPerFrame/10] modulo (1024*numberOfSlotsPerFrame), where SFNstart time and $slot_{start\ time}$ represent an SFN and a slot, respectively, of first transmission of the PDSCH after configured DL assignment is (re-)initialized, and numberOfSlotsPerFrame and numberOfSymbolsPerSlot indicate the number of consecutive slots per frame and consecutive OFDM symbols per slot, respectively (refer to Table 1 and Table 2).

If the CRC of a corresponding DCI format is scrambled with the CS-RNTI provided by the RRC parameter cs-RNTI, and a new data indicator field for an enabled transport block is set to 0, the UE validates, for scheduling activation or scheduling release, a DL SPS assignment PDCCH or a configured UL grant Type 2 PDCCH. Validation of the DCI format is achieved if all fields for the DCI format are set according to Table 5 and Table 6. Table 5 shows an example of special fields for DL SPS and UL grant Type 2 scheduling activation PDCCH validation, and Table 6 shows an example of special fields for DL SPS and UL grant Type 2 scheduling release PDCCH validation.

TABLE 5

|  | DCI format 0_0/0_1 | DCI format 1_0 | DCI format 1_1 |
| --- | --- | --- | --- |
| HARQ process number | set to all '0's | set to all '0's | set to all '0's |
| Redundancy version | set to '00' | set to '00' | For the enabled transport block: set to '00' |

TABLE 6

|  | DCI format 0_0 | DCI format 1_0 |
| --- | --- | --- |
| HARQ process number | set to all '0's | set to all '0's |
| Redundancy version | set to '00' | set to '00' |
| Modulation and coding scheme | set to all '1's | set to all '1's |
| Resource block assignment | set to all '1's | set to all '1's |

Actual DL assignment and UL grant for DL SPS or UL grant Type 2, and a corresponding MCS are provided by resource assignment fields (e.g., a TDRA field providing a TDRA value m, an FDRA field providing frequency resource block assignment, and/or an MCS field) in the DCI format carried by a corresponding DL SPS or UL grant Type 2 scheduling activation PDCCH. If validation is achieved, the UE considers information in the DCI format as valid activation or valid release of DL SPS or configured UL grant Type 2.

Figure 8:
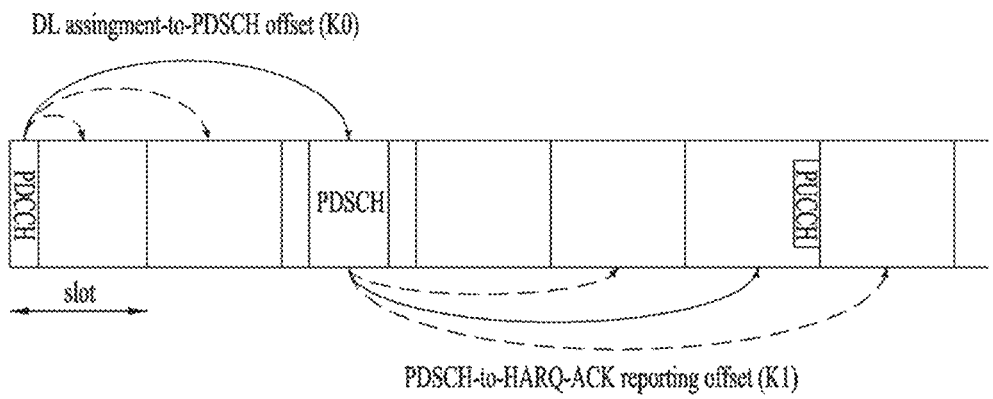
FIG. 8 illustrates a hybrid automatic repeat request-acknowledgement (HARQ-ACK) transmission/reception procedure.

FIG. 8 illustrates a HARQ-ACK transmission/reception procedure.

Referring to FIG. 8, the UE may detect a PDCCH in a slot n. Next, the UE may receive a PDSCH in a slot n+K0 according to scheduling information received through the PDCCH in the slot n and then transmit UCI through a PUCCH in a slot n+K1. In this case, the UCI includes a HARQ-ACK response for the PDSCH. If the PDSCH is configured to transmit a maximum of one TB, a HARQ-ACK response may consist of one bit. If the PDSCH is configured to transmit a maximum of 2 TBs, the HARQ-ACK response may consist of 2 bits when spatial bundling is not configured and one bit when spatial bundling is configured. When a HARQ-ACK transmission timing for a plurality of PDSCHs is designated as slot n+K1, UCI transmitted in slot n+K1 includes a HARQ-ACK response for the plural PDSCHs.

For a service with strict latency and reliability requirements (e.g., URLLC service), a PUSCH/PDSCH may have to be transmitted with higher reliability than in other existing services. To increase the reliability of PUSCH/PDSCH transmission, repeated transmissions of the PUSCH/PDSCH may be considered. For example, a BS may configure repeated PUSCH/PDSCH transmissions in K consecutive slots for a UE, and the UE may repeat a TB transmission/reception in the K consecutive slots. In some embodiments or implementations of the present disclosure, the same symbol allocation may be applied across the K consecutive slots. In other words, the K consecutive slots may be identical in terms of the index of the starting symbol and the number of symbols for the PUSCH/PDSCH. When the same resource allocation is used for repeated PUSCH/PDSCH transmissions, the reliability or coverage of the PUSCH/PDSCH transmission may be ensured. However, when only the same resource allocation is allowed for the PUSCH/PDSCH in consecutive slots scheduled for repeated PUSCH/PDSCH transmissions, this may make flexible resource allocation difficult. Moreover, when the UE has to perform PDCCH reception and PUSCH allocation in one slot to satisfy a latency requirement, only a few symbols in the latter half of the slot may be available for PUSCH transmission, resulting in deferral of the repeated transmissions to the following slot. In this case, when the UE needs to perform a predetermined number of repeated transmissions to secure reliability, a long latency may occur in the PUSCH/PDSCH transmission/reception. Therefore, for more flexible and efficient resource utilization and service support, and faster and more robust UL channel transmission, it is preferable to support a plurality of PUSCH/PDSCH transmissions in one slot by repeating a PUSCH/PDSCH transmission at intervals smaller than a slot, or to transmit the PUSCH/PDSCH regardless of a slot boundary. When a plurality of PUSCHs/PDSCHs are transmitted in one slot, frequency hopping for changing frequency resources between PUSCH/PDSCH transmissions may be additionally considered to secure reliability through frequency diversity.

A PUSCH/PDSCH transmission based on a configured grant as well as a PUSCH/PDSCH transmission based on a dynamic UL/DL grant may be repeated. In some embodiments or implementations of the present disclosure, in the case of a PUSCH/PDSCH transmission based on a configured grant, a resource allocation for one TB is always determined within one period of the configured grant. For example, the time duration of K repeated transmissions of one TB does not exceed a time duration derived from the periodicity P of the configured grant. When repeated transmissions are performed based on the configured grant, use of the same resource allocation in consecutive slots for the repeated transmissions is preferable in terms of sufficient reliability. In some embodiments/implementations of the present disclosure, the UE transmits/receives a PUSCH/PDSCH only at positions determined according to a redundancy version (RV) sequence among a plurality of PUSCH/PDSCH resources within the period of the configured grant. For example, in some embodiments/implementations, when a configured RV sequence is {0, 2, 3, 1}, the UE starts an initial transmission of a TB in the first of K transmission occasions (TO) for K repeated transmissions. In this case, it may be necessary to secure a long time to ensure the reliability of the PUSCH/PDSCH transmission, or it may be difficult to set a short period for a plurality of PUSCH resources. Particularly when the TB transmission starts in the middle of the plurality of PUSCH/PDSCH resources, that is, in the middle of the TOs within the period of the configured grant, it may be difficult to repeat the TB transmission a sufficient number of times.

Since the periodicity of the configured grant is closely related to the latency of the PUSCH/PDSCH, there may be a need for allowing an operation using a configured grant with a short periodicity regardless of the transmission duration of the PUSCH/PDSCH (e.g., the number of symbols occupied by the PUSCH/PDSCH). Alternatively, it may be necessary to allow a sufficient number of repeated transmissions, even when a TB transmission starts in the middle of PUSCH/PDSCH resources in the time domain. Accordingly, repeated PUSCH/PDSCH transmissions at intervals shorter than a slot may be required.

One of the representative scenarios of the next system, URLLC has the low-latency and high-reliability requirements of a user-plane delay of 0.5 ms and transmission of X bytes of data within 1 ms at or below an error rate of $10^{-5}$. In general, eMBB is characterized by a large traffic capacity, a file size equal to or less than tens to hundreds of bytes, and sporadic occurrence. Therefore, eMBB requires transmission at a maximum transmission rate with minimum overhead of control information, whereas URLLC requires a short scheduling time unit and a reliable transmission method.

Depending on application fields or traffic types, various reference time units may be assumed/used to transmit/receive a physical channel. A reference time may be a basic unit for scheduling a specific physical channel, and a reference time unit may be changed according to the number of symbols and/or a subcarrier spacing (SCS) in the scheduling time unit. Some embodiments/implementations of the present disclosure are described in the context of a slot or mini-slot as a reference time unit, for convenience of description. A slot may be, for example, a basic scheduling unit used for general data traffic (e.g., eMBB). A mini-slot may have a shorter duration than a slot in the time domain, and may be a scheduling basic unit used for a special purpose or for a special communication scheme (e.g., URLLC, an unlicensed band, or millimeter wave). However, the embodiment(s)/implementation(s) of the present disclosure may also be applied to physical channel transmission/reception in mini slots for eMBB or physical channel transmission/reception in slots for URLLC or other communication schemes.

In some embodiments/implementations of the present disclosure, when the BS indicates UL or DL resources to the UE by L1 signaling (e.g., a PDCCH or RAR) or configure the UL or DL resources for the UE by a higher-layer configuration (e.g., an RRC configuration), and then the UE performs UL/DL transmission/reception in the UL/DL resources, radio resources are allocated without any limitation from a frame structure of a wireless communication system. Therefore, appropriate resources are allocated regardless of a traffic generation time.

Figure 9:
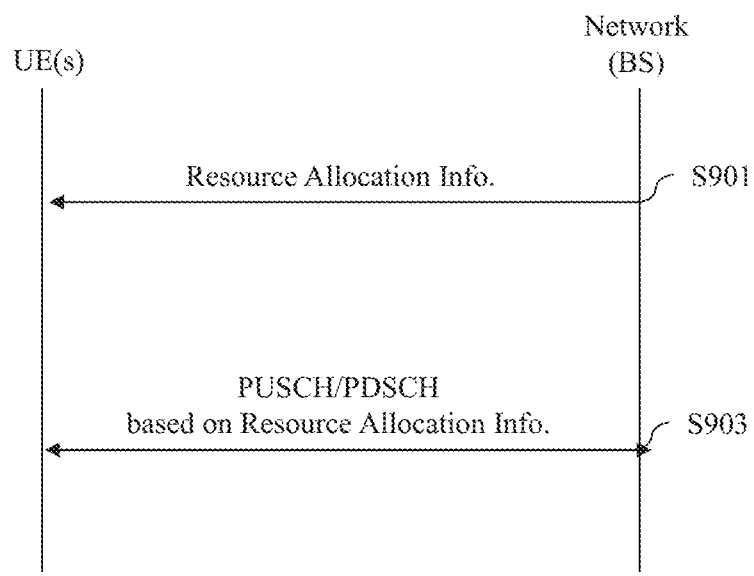
FIG. 9 is a diagram illustrating an exemplary uplink/downlink (UL/DL) transmission procedure for some embodiments/implementations of the present disclosure.

FIG. 9 is a diagram illustrating an exemplary UL/DL transmission procedure for some embodiments/implementations of the present disclosure.

—BS Operation—

Referring to FIG. 9, a network (e.g., at least one BS) may determine resources for PDSCH transmission to a UE or resources for PUSCH transmission from the UE to the BS and transmit resource allocation information related to the determined resources to the UE (S901). The resource allocation information may be transmitted by physical-layer signaling (e.g., a PDCCH). For example, the resource allocation information may correspond to UL grant DCI for a PUSCH or DL grant DCI for a PDSCH.

In this case, the network may allocate the resources for the PUSCH or the PDSCH according to the method(s) of Example 1 and/or Example 2 to be described later. For example, the network may allocate resources to the UE according to the size of data to be transmitted without any limitation from a slot boundary.

The resource allocation information may be transmitted by higher-layer signaling, not limited to physical-layer signaling. For example, the resource allocation information may be transmitted to the UE in RRC configuration information which is higher-layer signaling transmitted in a random access procedure.

The UE operation of receiving resource allocation information from the BS may be implemented by, for example, the apparatus of FIG. 2 or FIG. 3. For example, referring to FIG. 2, the at least one processor 102 may control the at least one transceiver 106 and/or the at least one memory 104 to receive resource allocation information, and may receive the resource allocation information from the BS through the at least one transceiver 106.

The network may perform PDSCH transmission to the UE and/or PUSCH reception from the UE based on the resource allocation information (S903). The network operation of transmitting a PDSCH/receiving a PUSCH to/from the UE based on resource allocation information may be implemented by, for example, the apparatus of FIG. 2 or FIG. 3. For example, referring to FIG. 2, the at least one processor 102 may control the at least one transceiver 106 and/or the at least one memory 104 to transmit a PDSCH/receive a PUSCH based on resource allocation information, and may transmit the PDSCH to the UE or receive the PUSCH from the UE through the at least one transceiver 106.

—UE Operation—

The UE may receive resource allocation information from the network (S901). To receive the resource allocation information, the UE may attempt blind detection. The network may allocate resources in the method(s) of Example 1 and/or Example 2 to be described later.

The UE may decode the resource allocation information. The UE may receive a PDSCH from the network and/or transmit a PUSCH to the network in resources allocated by the network based on the resource allocation information (S903).

After decoding the resource allocation information, the UE may determine a transport block size (TBS) for the PDSCH reception and/or the PUSCH transmission. Alternatively, the network may determine the TBS for the PDSCH transmission and/or the PUSCH reception.

In some embodiments/implementations of the present disclosure, one PDSCH/PUSCH transmission may be performed across a plurality of consecutive/non-consecutive resource units (e.g., slots). For example, resources may be allocated to the UE for a single PDSCH or PUSCH without any limitation from a slot boundary.

The process of FIG. 9 may be applied to Example 1 and/or Example 2.

Overview of Example 1

In some scenarios, when the network allocates PUSCH or PDSCH resources to UE(s) by a PDCCH, the network may allocate the resources on a symbol basis, but it may be restricted that a set of corresponding symbols should exist within one slot. Although this restriction does not significantly affect a latency-tolerable general service, as the size of resources which may be allocated for a traffic transmission is different depending on whether traffic occurs at the former half or latter half of a slot in the case of a URLLC transmission with a latency requirement of no more than a few slots, the traffic transmission needs to be postponed to the following slot, so that resources satisfying a reliability requirement are allocated. For example, when the UE is capable of receiving a PDSCH or transmitting a PUSCH, starting from an N-th slot in the latter half of a slot in consideration of a reception time of a PDCCH that allocates PUSCH or PDSCH resources and a processing time of the UE, the UE may be allocated to only resources within up to 14-N symbols from the N-th slot to the last symbol according to embodiments/implementations with the constraint that PUSCH/PDSCH resources should exist within a slot. When more than 14-N symbols are required for the PUSCH/PDSCH transmission, the BS should schedule the PUSCH/

PDSCH in the next slot. Accordingly, the constraint that PDSCH/PUSCH resources are not allocated across a slot boundary may cause an unnecessary latency. In this context, a method of allocating resources regardless of a slot boundary is required.

Example 1-1: Non-Slot Repetition

The network may allocate small radio resources spanning a predetermined number of symbols and allow the UE to repeatedly use the radio resources.

The BS may allocate resources spanning L symbols to the UE, which may be repeatedly used regardless of a resource allocation time and, at the same time, transmit to the UE a repetition parameter K indicating the number of times the resources may be used repeatedly by L1 signaling (e.g., a PDCCH) (S901). Alternatively, before allocating the L-symbol resources to the UE, the network may indicate or configure the repetition parameter to or for the UE by higher-layer signaling (e.g., RRC signaling). The UE may use the allocated resources spanning L symbols as many times as indicated by the repetition parameter K, thereby achieving a similar effect to allocation of resources of L*K symbols (e.g., the effect of repeated PDSCH receptions and/or repeated PUSCH transmissions). For example, when resources of L symbols as a time duration occupied by a PUSCH/PDSCH are allocated to the UE and a repetition parameter K is configured for the UE, the UE may repeat the PUSCH transmission/PUSCH reception occupying L symbols K times, hence in a total of L*K symbols.

Example 1-1 may advantageously minimize signaling overhead because the UE and/or the BS may repeatedly use one resource allocation according to a given scheme.

Example 1-2: Multiple Segments

When the BS allocates radio resources to the UE by a resource allocation message, the BS may allocate the resources across a slot boundary, and the UE may perform a PUSCH transmission and/or a PDSCH reception in each slot in which the allocated resources are located. That is, the network may allocate available radio resources to the UE without any limitation from a slot boundary by higher-layer signaling or L1 signaling. For example, when the BS allocates 6 symbols to the UE and the symbols are available, starting from the 13th symbol of a slot, the UE may use the 13th symbol of the slot to the 4th symbol of the next slot to transmit the PUSCH or receive the PDSCH.

Example 1-2 may advantageously enable the UE to use as many resources as possible because the UE may flexibly determine resources according to the slot format of a slot in which resources are allocated.

In Example 1-2, the following examples may be considered from the perspective of signaling.

Example 1-2-1

When the UE receives information about a resource allocation of an M-th symbol to a K-th symbol (K>M) in slot n (S901), the UE may interpret the resource allocation as a resource allocation of a K-th symbol in slot n to an M-th symbol in slot n+1, when a PDSCH reception or a PUSCH transmission is impossible in the allocated resources of slot n based on a 1-bit flag that may be received simultaneously with the information about the resource allocation or in consideration of a PDCCH reception time and a processing time.

For example, when the 1-bit flag received together with signaling of the resource allocation is set to a specific value or when the number of the remaining symbols of the slot at a time determined in consideration of the processing time from the PDCCH reception time is less than the number of allocated symbols, the UE may consider that the PDSCH may be received or the PUSCH may be transmitted even using symbols in the next slot without any limitation from a slot boundary. For example, the UE may receive a PDSCH spanning from a K-th symbol in slot n to an M-th symbol in slot n+1 (S903) or transmit a PUSCH spanning from the K-th symbol in slot n to the M-th symbol in slot n+1 (S903). In the same manner, the BS may transmit the PDSCH or receive the PUSCH over slot n and slot n+1 in consideration of radio resources to be received or transmitted by the UE. In Example 1-2-1, a PDSCH reception or a PUSCH transmission may be indicated to the UE by allocating consecutive resources across a slot boundary with a minimum change in a TDRA framework in which a time-domain resource allocation is confined to within a slot and without additional control signaling overhead. Example 1-2-1 may advantageously extend scheduling information limited to one slot to two slots without much signaling overhead by a relationship between a UE capability and a scheduling time or by a 1-bit signal.

Alternatively, the UE may perform PDSCH receptions or PUSCH transmissions respectively in the K-th symbol to the last symbol in slot n and in the first symbol to the M-th symbol in slot n+1 (S903). For example, the UE may receive/transmit a PDSCH/PUSCH spanning the K-th symbol to the last symbol in slot n and receive/transmit a PDSCH/PUSCH spanning the first symbol to the M-th symbol in slot n+1. In the same manner, the BS may transmit/receive the PDSCH/PUSCH separately in slot n and slot n+1 in consideration of radio resources to be received or transmitted by the UE. In Example 1-2-1, a plurality of PDSCH receptions or a plurality of PUSCH transmissions may be indicated to the UE with a minimum change in a TDRA framework in which a time-domain resource allocation is confined to within a slot and without additional control signaling overhead. ***Example 1-2-2

In the case where the BS transmits information about a resource allocation of an M-th symbol to a K-th (K>M) symbol in slot n to the UE (S901), when the BS indicates a repetition parameter R by L1 signaling along with the transmission of the information about the resource allocation or when the BS preconfigures the repetition parameter R by higher-layer signaling, the UE may interpret the resource allocation as a resource allocation of the M-th symbol in slot n to the K-th symbol of slot n+R−1.

The UE may perform a PDSCH reception or a PUSCH transmission in the M-th symbol to the last symbol of slot n, all symbols of slot n+r (1<=r<R), and the first symbol to the K-th symbol in slot n+R−1 (S903). In the same manner, the BS may perform the PDSCH transmission or the PUSCH reception in consideration of radio resources to be received or transmitted by the UE.

Alternatively, the UE may perform the PDSCH reception or the PUSCH transmission in each of slot n to slot n+R−1, using the M-th symbol to the last symbol of slot n, all symbols of slot n+r (1<=r<R), and the first symbol to the K-th symbol of slot n+R−1 (S903). In the same manner, the BS may transmit the PDSCH or receive the PUSCH in each of slot n to slot n+R−1 in consideration of radio resources to be received or transmitted by the UE.

Example 1-2-2 enables PUSCH/PDSCH scheduling across a plurality of slots or PUSCH/PDSCH scheduling in each individual one of a plurality of slots by different interpretation of existing parameter(s) without the need for additional signaling or an additional parameter.

Example 1-2-3

When the UE receives resource allocation information in one resource allocation message (e.g., scheduling DCI) (e.g., S901), the UE may simultaneously receive information about a plurality of TDRAs. In this case, the UE transmits the same TB in each TDRA. The UE may ignore a part of information included in at least one of the plurality of TDRAs. For example, when two TDRAs are indicated to the UE, the UE may use a value obtained by adding a specific value, for example, a value corresponding to one slot to $K_0$ or $K_2$ included in the first TDRA, instead of $K_0$ or $K_2$ included in the second TDRA. In the same manner, the BS may transmit the PDSCH or receive the PUSCH in consideration of radio resources to be received or transmitted by the UE.

When the value of $K_0/K_2$ is changed, a TDRA entry should be configured for $K_0/K_2$, thereby increasing the number of TDRA entries. In Example 1-2-3, for example, the first of a plurality of TDRAs provided to the UE by one resource allocation message may be used for an actual resource allocation, and the second TDRA may be used as information that schedules a slot following a slot scheduled by the first TDRA.

FIG. 10 is a diagram illustrating an example of the present disclosure.

According to Example 1-2-3, when a resource allocation for consecutive slots is provided through a plurality of TDRAs, the UE may be configured to ignore some parameters configured in TDRAs to fully utilize even TDRA entries with invalid $K_0$ or $K_2$ among preconfigured TDRAs.

Referring to FIG. 10, it is assumed that the BS intends to allocate the last L1 symbols of slot n and the first L2 symbols of slot n+1 as time resources, as illustrated in FIG. 10(a). To enable the BS to allocate resources as illustrated in FIG. 10(a), a TDRA entry with a slot offset value $K_0/K_2$ for indicating slot n and by different interpretation of existing parameter(s) with a slot offset value $K_0/K_2$ for indicating slot n+1 should be configured or defined separately, for the same symbol length L2.

According to Example 1-2-3, the slot offset value of the second TDRA may be determined based on the slot offset value of the first TDRA among the plurality of TDRAs provided to the UE by the BS. For example, referring to FIG. 13(b), the BS may provide TDRA #a as the first TDRA and TDRA #b as the second TDRA to the UE. The UE may identify a starting symbol value S2 and a symbol duration value L2 in a slot based on TDRA #b and determine that the time resources illustrated in FIG. 13(a) have also been allocated in slot n+1 following slot n indicated by the offset value configured in the first TDRA, TDRA #a by applying the starting symbol value S2 and the symbol duration value L2 to slot n+1. Accordingly, it is not necessary to separately configure or define a TDRA entry indicating a combination of the slot offset value $K_0/K_2$ indicating slot n+1, the starting symbol value S2 and the symbol duration value L2.

As a consequence, the UE and the BS may perform a resource allocation for consecutive slots by using a plurality of TDRA entries without increasing a predetermined number of TDRA entries.

Overview of Example 2

Example 2 relates to TBS determination in consideration of the amount of a resource allocation. TBS determination methods of Example 2 may be performed/implemented separately from Example 1. Alternatively, the TBS determination methods may be performed/implemented in conjunction with Example 1. For example, for a PDSCH reception and/or a PUSCH transmission based on resource allocation information according to Example 1, the UE and/or the network may determine a TBS according to Example 2. In FIG. 9, a PDSCH reception and/or a PUSCH transmission may be performed over a plurality of consecutive/non-consecutive resource units (e.g., slots). Unless otherwise specified, reference may also be made to FIG. 9 to describe Example 2.

When a transmission over a plurality of slots is allowed for flexible resource allocation to the UE, TBS determination may be difficult. In some scenarios, a TBS for transmission is determined based on resources allocated for the transmission and MCS information. Therefore, if a resource size is not equal in each slot, the size of allocated resources is different in each of the plurality of slots and thus different TBSs may be derived. To enable the network or the UE to transmit one TB in each of a plurality of slots, a method of deriving the same TBS is required.

Example 2-1

The UE or the BS determines a TBS based on the first PUSCH or PDSCH in the first slot indicated by a resource allocation. For example, when resources allocated by the BS are consecutive over a plurality of slots or are repeated in units of a predetermined number of symbols, a TBS may be calculated based on the first PUSCH or PDSCH in the first slot to which the resources are allocated. Then, the PUSCH or the PDSCH may be transmitted in the next slot only in consideration of i) the determined TBS and ii) a modulation order selected based on an MCS (S903). According to Example 2-1, the BS and the UE may successfully transmit or receive the PDSCH/PUSCH, assuming the same TBS.

Example 2-2

The network/UE derives a TBS based on the size of resources substantially configured regardless of a slot boundary. For example, when i) resources of length L are repeated K times or ii) one TB is transmitted in each of resources of length L1, L2, . . . , LN, a TBS may be derived using L*K or sum(L1, L2, . . . , LN) resources. In other words, a TBS is derived in consideration of substantially all transmission resources indicated by one DCI. A PDSCH/PUSCH allocated in each slot may be transmitted only in consideration of i) the determined TBS and ii) a modulation order selected based on an MCS (S903). According to Example 2-2, the BS and the UE may successfully transmit or receive the PDSCH/PUSCH, assuming the same TBS. Therefore, the UE and the BS may easily select an MCS value having the same TBS regardless of the starting position of a resource allocation.

Example 2-2-1

In the case where one TB is transmitted in each of N resources of length L1, L2, . . . , LN and thus N transmissions are performed for the one TB, when some resource is excluded for another UE operation or the size of some resource is changed, the UE and/or the BS may determine a TBS by applying the changed size to ensure the reliability of each transmission. Example 2-2-1 allows the UE/BS to select a TBS suitable for a given code rate, so that a TBS transmission may be performed with reliability closer to given or required transmission reliability.

Example 2-2-2

Alternatively, in the case where one TB is transmitted in each of N resources of length L1, L2, . . . , or LN and thus N transmissions are performed for the one TB, when some resource is excluded for another UE operation or the size of some resource is changed, the UE and/or the BS may determine a TBS only based on initially given resource information regardless of the resource exclusion or the size change, for consistency of TBS determination. Example 2-2-2 may be useful when the UE/BS supports a given packet size for a particular service. For consistent TBS determination, a separate overhead parameter may be introduced, or a given overhead parameter may be ignored.

Example 2-2-3

Alternatively, for appropriate TBS determination and consistency of TBS determination, a TBS used by the UE may be given separately regardless of a resource allocation. The TBS may be indicated by L1 signaling simultaneously with a resource allocation from the BS, or may be configured by higher-layer signaling. To this end, a separate TBS table may be configured or pre-given by RRC signaling, and the BS may indicate or configure an index linked to one of the entries in the TBS table to or for the UE.

Example 2-3

When a TBS is determined in the method of Example 2-1 or 2-2, the determined TBS may not be suitable for each PUSCH resource separated by the method of Example 1. For example, given X bits as one TBS, if NRE*M<X for a given modulation order M and the number NRE of REs used for data transmission included in PUSCH resources, the UE may not successfully transmit even the systematic bits of a corresponding TB. Therefore, to select an appropriate TBS even for separated resources, the following may be additionally considered.

Example 2-3-1

To select a TBS suitable for a given PUSCH resource size or a given PDSCH resource size, a scaling factor may be considered in addition to a determined TBS value. This allows for a more flexible determination of a smaller TBS. For example, when a scaling factor alpha is applied to a TBS value, a new TBS value $TBS_{new}$ may be TBS*alpha. The corresponding value (i.e., $TBS_{new}$) may be converted to an integer by a process such as ceiling, flooring, or rounding (hereinafter, represented by "int") or to a multiple of a specific integer value K by the following equation, for application: $TBS_{new}=\text{int}\{TBS_{new}/K\}*K$. The scaling factor alpha and the integer value K may be values determined or preconfigured by L1 signaling or higher-layer signaling from the BS.

Example 2-3-2

When one piece of resource allocation information may be interpreted as a plurality of PUSCH/PDSCH resources, the UE or the BS determines a TBS based on the smallest PUSCH/PDSCH resource. Then, a PUSCH or a PDSCH may be transmitted only in consideration of i) the determined TBS and ii) a modulation order selected based on an MCS (S903). In this manner, the UE and the BS may successfully transmit or receive the PDSCH/PUSCH, assuming the same TBS.

Example 2-3-3

Alternatively, when the UE receives resource allocation information from the BS and one piece of resource allocation information (e.g., one resource allocation (e.g., scheduling by one DCI or configuration of one configured grant)) may be interpreted as a plurality of PUSCH/PDSCH resources, a PUSCH/PDSCH having the smallest resource size may not be sufficient to transmit a TBS determined according to Example 2-1, Example 2-2, or any other method at a specific code rate C. In this case, the UE may determine the corresponding resource information to be invalid. For example, when M*NRE<B for a given modulation order M and the number NRE of REs available for data transmission in the corresponding resources, the UE may determine that the corresponding resource information is invalid.

On the other hand, the UE may assume that it does not receive L1 signaling or higher-layer signaling including invalid resource information from the BS. Alternatively, when receiving the L1 signaling or higher-layer signaling, the UE may consider that the signaling has not been received successfully and drop (i.e., skip) the PUSCH transmission or the PDSCH reception. B representing a specific bit length (i.e., the number of bits) may be equal to a given TBS or may be obtained based on the given TBS. For example, when C is a certain code rate, $B=TBS*C^{(-1)}$. The code rate C may be a value obtained by applying a certain offset to an MCS index indicated by DCI, the largest value in a used MCS table, or a value indicated or preconfigured by L1 signaling or higher-layer signaling.

Example 2-4

Alternatively, when the UE receives resource allocation information from the BS and a repetition factor is indicated or configured to or for the UE, the UE may determine a TBS determination method in consideration of the repetition factor. For example, when the value of the repetition factor or the magnitude of a value indicated by the repetition factor is equal to or greater than a specific value X, the UE may determine a TBS based on the first of resources configured for or indicated to the UE. Alternatively, another example of the present disclosure may be used to determine a TBS. In addition, when the value of the repetition factor or the magnitude of the value indicated by the repetition factor is equal to or greater than the value X, another example of the present disclosure, for example, the size of all resources allocated to a corresponding TB may be considered to determine a TBS (see Example 2-2). When configuring a configured grant, the BS may configure a repetition number repK for the UE by higher-layer signaling, and the repetition number repK related to the configured grant may be used as a repetition factor in Example 2-4. Alternatively, the BS may configure a slot aggregation factor, which is a parameter indicating a data repetition number for a serving cell or a BWP, by higher-layer signaling, and the slot aggregation factor may be used as a repetition factor in Example 2-4. Alternatively, a data field or parameter indicating or configuring an operation related to repeated transmissions (e.g., a field in DCI, indicating an operation related to repeated transmissions) may be used as a repetition factor in Example 2-4.

Given a repetition factor R associated with a resource allocation, it may be interpreted that the resource allocation is for R consecutive slots. For example, the UE and the BS may assume at least one TO (or reception occasion (RO)) based on the resource allocation in each of the R consecutive slots (if there is any symbol available for transmission (or reception) in the corresponding slot).

Example 2-5

Alternatively, when the UE receives resource allocation information from the BS, a TBS determination method may be determined according to whether indicated or configured resources are located across a slot boundary. For example, when resources indicated or configured to transmit one TB are not located across a slot boundary, a TBS may be determined based on the first resource among the configured or indicated resources. Alternatively, when resources indicated or configured to transmit or receive one TB are not located across a slot boundary, other examples of the present disclosure may be used to determine a TBS. In addition, when resources indicated or configured to transmit or receive one TB are not located across a slot boundary, other examples of the present disclosure, for example, the size of all resources allocated to the TB may be used to determine a TBS (see Example 2-2).

When the UE receives resource allocation information from the BS, the resource allocation methods of Example 1 and other resource allocation methods may be used in combination. The UE may consider the entire given resources to determine whether indicated or configured resources are located across a slot boundary. For example, when one resource allocation is interpreted as allocation of a plurality of PDSCHs/PUSCHs, Example 2-5 may be applied if the given resources are across the slot boundary even though each PDSCH/PUSCH is not across the slot boundary.

Methods of determining available resources in Example 3 described below may be implemented in conjunction with Example 1 and/or Example 2 described above or independently of Example 1 and Example 2.

Overview of Example 3

Figure 11:
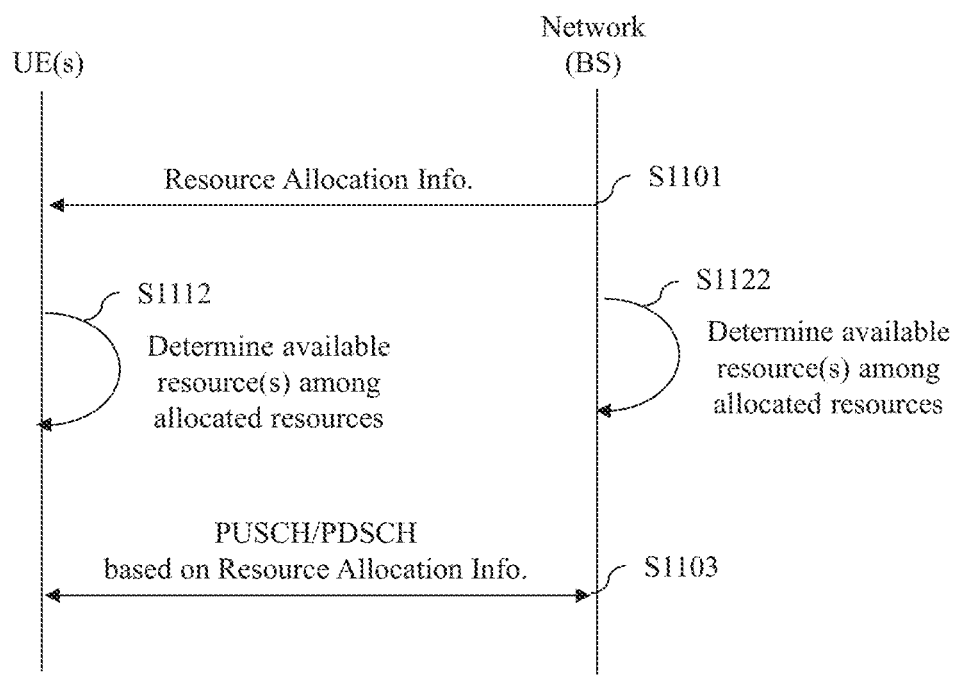
FIG. 11 is a diagram illustrating another exemplary UL/DL transmission procedure for some embodiments/implementations of the present disclosure.

FIG. 11 is a diagram illustrating another exemplary UL/DL transmission process for some embodiments/implementations of the present disclosure.

A description of FIG. 11 redundant to the description of FIG. 9 is avoided, and the description of FIG. 9 may be referred to for FIG. 11.

For convenience, FIG. 11 is based on the assumption that a plurality of resource units (e.g., slots) are allocated/indicated to the UE by resource allocation information.

Even though the UE has received resource allocation information corresponding to a plurality of slots (S1101), the UE may not be allowed to use some of allocated radio resources for a corresponding PDSCH reception/PUSCH transmission according to a slot format configuration and indication from the BS. For example, when PUSCH resources corresponding to a plurality of slots are allocated to the UE, symbols corresponding to at least some of the PUSCH resources may be actually unusable for UL. An unusable UL symbol may be, for example, resources which are configured/indicated as DL (e.g., fixed DL) resources or reserved resources (e.g., flexible resources) by an SFI in SFI DCI and/or by a semi-static DL (UL) configuration (e.g., RRC signaling, system information, or UE-dedicated semi-static signaling) and thus unusable for UL. It may occur that the UE is not capable of transmitting a PUSCH in a corresponding slot (e.g., a slot including symbols unusable for UL) due to resources unusable for UL.

For example, the UE operation of receiving resource allocation information from the BS and the UE operation of receiving a PDSCH or transmitting a PUSCH based on the resource allocation information may be implemented by, for example, the apparatus of FIG. 2 or FIG. 3. For example, referring to FIG. 2, the at least one processor 102 may control the at least one transceiver 106 and/or the at least one memory 104 to receive resource allocation information and receive a PDSCH or transmit a PUSCH based on the resource allocation information. The processor 102 may receive the resource allocation information from the BS through the at least one transceiver 106, and may receive the PDSCH or transmit the PUSCH through the at least one transceiver 106 based on the resource allocation information.

The UE and the BS may derive/determine the same resources available for an actual PDSCH or PUSCH transmission among resources allocated to the UE, based on common information that the UE and the BS have (S1112 and S1122), which may solve the above-described problem. For example, because the UE and the BS derive/determine the same resources available for the actual transmission, the UE and the BS may receive/transmit the PDSCH or the PUSCH in available resources that they identify even though a complex slot format is given or the slot format is not accurately aligned with the resource allocation.

In some embodiments or implementations of the present disclosure, the operation of deriving/determining actual available resources by the UE or the BS may be implemented by the apparatus(s) described in FIG. 2 or FIG. 3. For example, referring to FIG. 2, the at least one processor 102 may derive/determine resources available for an actual transmission based on received resource allocation information.

When a resource allocation given for slot n is extended to slot n+K (K>0) or resources to be used in a slot are implicitly allocated according to the methods discussed in Example 1 or similar methods, the following methods may be considered to select resources (or a TO) to be used for a transmission in some embodiments or implementations of the present disclosure. In some embodiments/implementations of the present disclosure, a TO may refer to time-domain resources. For example, a PUSCH TO may be time resources occupied by one PUSCH, and a PDSCH TO may be time resources occupied by one PDSCH. A TO may correspond to an RO from the perspective of a receiver. For example, a PUSCH TO may correspond to a PUSCH RO from the perspective of the BS, and a PDSCH TO may correspond to a PDSCH RO from the perspective of the UE.

In the following description, a "semi-statically configured DL (UL) symbol" may refer to a symbol configured as a DL (UL) symbol by RRC signaling, system information, and/or UE-dedicated RRC signaling. For example, a DL/UL symbol according to a UE-common or UE-dedicated TDD DL-UL pattern configured by RRC signaling may be a semi-statically configured DL/UL symbol. In another example, a UE-common or UE-dedicated pattern of invalid symbols for a DL/UL transmission may be configured by RRC signaling, and DL/UL symbols that are not invalid for DL/UL in the pattern may be semi-statically configured DL/UL symbols. When the BS provides a resource set unavailable for the PDSCH or the PUSCH to the UE (e.g., by rate-matching pattern information), DL or UL symbols which are not indicated as invalid DL or UL symbols by the resource set may be semi-statically configured DL/UL symbols.

Regarding a UL Transmission (and/or a DL Transmission), the Following Options May be Considered.

Option 1: A TO starting from the first symbol in the next slot is generated based on a given resource allocation for a UL(DL) transmission in a slot. Semi-statically configured DL(UL) TOs may be counted as potential TOs in Option 1. In other words, the network/UE applies the resource allocation, determining all symbols as available symbols irrespective of a slot format in Option 1.

Option 2: A TO starting from an earliest flexible or semi-statically configured UL(DL) symbol in the next slot is generated based on a given resource allocation for a UL(DL) transmission in a slot. In other words, the network/UE applies the resource allocation, determining that semi-static symbols configured to be the same transmission direction as the resource allocation and flexible symbols are available symbols. In some embodiments/implementations, semi-statically configured DL(UL) TOs directed in the opposite direction to the transmission direction of the resource allocation may be excluded from TO counting in Option 2. In some embodiments/implementations, a DL-to-UL switching gap may be counted as a potential TO in Option 2.

Option 3: A TO starting from the first semi-statically configured UL(DL) symbol in the next slot is generated based on a given resource allocation for a UL(DL) transmission in a slot. In other words, the network/UE applies the resource allocation, determining that semi-static symbols configured to be the same transmission direction as the resource allocation are available symbols. According to Option 3, slot format ambiguity caused by loss of a dynamic SFI may be avoided.

Option 4: A TO starting from the same symbol as a starting OFDM symbol for TO generation in a slot is also generated in the next slot based on a given resource allocation for a UL(DL) transmission in the slot. For example, a time-domain resource allocation of a configured grant is reused in the next slot in Option 4. As a consequence, the network/UE uses the same symbol in each slot, if possible. In some scenarios in which different BSs/UEs perform slot-level repetitions, Option 4 is advantageous in terms of resource utilization.

As described above, there is a trade-off between options according to a slot format configuration for a slot to which a resource allocation is applied. For example, the earliest symbol is not available for a UL transmission in a slot with a DL-to-UL switching gap. Therefore, TO determination based on Option 2 may cause a partial or full UL transmission failure in the slot. In contrast, since a resource allocation for a slot is also used for the next slot with no regard to a slot format in Option 4, flexible resources configured by the BS may not be used in some cases, leading to resource inefficiency.

A method of determining the most appropriate available symbol(s) based on information that the UE and the BS have in common is described. While operations of a UE and a BS are described based on information of a semi-static DL/UL configuration for which an integrity check is possible by a higher-layer procedure in Example 3, for convenience of description, Example 3 may also be applied to a case in which available symbols are determined based on other slot format information, for example, a cell/UE-specific semi-static UL/DL configuration or a dynamic SFI in DCI, and a different method may be used in each case.

Example 3-1

The network/UE may determine available symbols from among allocated symbol resources in a different method depending on the presence or absence of a DL/UL switching point, for example, a DL-to-UL switching gap in a slot to which a resource allocation is applied (S1112 and S1122). For example, the UE determines semi-statically usable symbols according to a transmission direction (e.g., UL symbols for the PUSCH or DL symbols for the PDSCH) as available symbols in a slot in which the DL/UL switching point exists or may exist. That is, UL symbols may be determined as available symbols in a PUSCH transmission in which the data transmission direction is UL, and DL symbols may be determined as available symbols in a PDSCH transmission in which the data transmission direction is DL.

In a slot in which the DL/UL switching point does not or may not exist, flexible symbols and semi-statically usable symbols may be determined as available symbols. The UE may perform a DL reception or a UL transmission in a set of consecutive available symbols. In the same manner, the BS may perform a DL transmission or a UL reception by deriving radio resources to be received or transmitted by the UE.

In Example 3-1, in the presence of a DL/UL switching point in a slot, generation of a TO including the DL/UL switching gap is prohibited, thereby enabling the UE or the BS to secure more TOs.

Example 3-2

Alternatively, for a slot where a DL/UL switching point exits or may exist, the network/the UE may determine semi-statically usable symbols according to a transmission direction (e.g., UL symbols for the PUSCH or DL symbols for the PDSCH) and non-unusable symbols (e.g., flexible or DL symbols for the PDSCH and flexible or UL symbols for the PUSCH) among symbols indicated by explicitly provided resource allocation information (e.g., a resource allocation through DCI scheduling) as available symbols (S1112 and S1122). For example, when a resource allocation in scheduling DCI provides symbols #4 to slot #8, non-unusable symbols among symbols #4 to slot #8 may be determined as available symbols. In other words, flexible symbols in a symbol region to which resources are explicitly allocated may be determined as available symbols in addition to symbols available according to a transmission direction. That is, the UE and the network may determine symbols semi-statically determined according to a transmission direction and resources recognized explicitly as available by scheduled resource information to be available symbols. For example, the network may provide the UE with resource information including information related to available symbols as scheduling information (through a PDCCH) to the UE to explicitly indicate available symbols to the UE. The UE may identify symbols indicated by scheduled resource information and symbols semi-statically determined according to a transmission direction as available symbols. In other words, for a transmission in a specific direction, i) symbols for which the same direction as the specific direction is configured semi-statically and ii) symbols indicated for transmission in the specific direction by explicit resource allocation information (e.g., DCI) among symbols for which a symbol direction is semi-statically configured as flexible may be determined as available symbols.

In a slot in which the DL/UL switching point does not or may not exist, flexible symbols and semi-statically usable symbols may be determined as available symbols. The UE may perform a DL reception or a UL transmission in a set of contiguous available symbols. In the same manner, the BS may perform a DL transmission or a UL reception by deriving radio resources to be received or transmitted by the UE.

The network/UE may apply Example 3-2 to a slot in which a DL/UL switching point exists or may exist. In the presence of the DL/UL switching point in a slot, a flexible symbol may be used as a DL-to-UL guard period and thus arbitrary free use of the flexible symbol by the network/the UE may cause a problem. However, a flexible symbol in a region of symbols explicitly indicated for a UL or DL transmission may be used as resources for the corresponding link direction by using Example 3-2. Therefore, Example 3-2 enables use of more resources in a transmission based on previous scheduling information that the BS has configured in consideration of a DL/UL switching point, which the UE may have.

Example 3-3

Alternatively, for a slot in which the DL/UL switching point exists or may exist, the network/UE may determine, as available symbols, symbols semi-statically usable according to a transmission direction (e.g., UL symbols for the PUSCH or DL symbols for the PDSCH) and consecutive non-unusable symbols (e.g., flexible or DL symbols for the PDSCH or flexible or UL symbols for the PUSCH) from the starting OFDM symbol of resources explicitly pre-allocated (by DCI) (S1112 and S1122).

When there is a DL/UL switching point in one symbol or the first symbol of a slot preceding a certain slot, or when any of a plurality of slots indicated by resource allocation information includes a DL/UL switching point, available symbols may be determined in the same manner as for a slot including a DL/UL switching point, described in Example 3-2.

For a slot in which a DL/UL switching point does not or may not exist, flexible symbols and semi-statically usable symbols are determined as available symbols. The UE may perform a DL reception or a UL transmission in a set of consecutive available symbols. The BS may perform a DL transmission or a UL reception by deriving radio resources to be received or transmitted by the UE in the same manner.

As the same available symbols are assumed in each slot in the presence of at least one DL/UL switching point in slots to which resources are allocated, this method may simplify a UE operation for UL transmission or DL reception, when all or a plurality of slots include DL/UL switching points as is the case with a self-contained structure.

Example 3-4

Alternatively, the network/UE may determine some flexible symbols of a predetermined size X or a predetermined ratio Y may be determined as available symbols from among given flexible symbols in a slot in which a DL/UL switching point exists or may exist (S1112 and S1122).

In a slot in which a DL/UL switching point does not or may not exist, flexible symbols and semi-statically usable symbols may be determined as available symbols. The UE may perform a DL reception or a UL transmission in a set of consecutive available symbols. The BS may perform a DL transmission or a UL reception by deriving radio resources to be received or transmitted by the UE in the same manner.

In Example 3-4, the value of X and/or the value of Y may be indicated and/or configured or predefined by L1 signaling and/or higher-layer signaling from the BS.

More specifically, when N symbols are indicated or configured as flexible in a slot in which a DL/UL switching point exists or may exist, the UE may assume that the first X ones of the N symbols are available for the PDSCH and the last X ones of the N symbols are available for the PUSCH, based on an indicated or configured value of X.

More specifically, when N symbols are indicated or configured as flexible in a slot in which a DL/UL switching point exists or may exist, the UE may assume that the first Y/N ones of the N symbols are available for the PDSCH and the last Y/N ones of the N symbols are available for the PUSCH, based on an indicated or configured value of Y When Y/N is not an integer, the network and/or the UE may convert Y/N to an integer by a process such as ceiling, flooring, or rounding, for use in determining available symbols.

According to Example 3-4, as the UE assumes that a certain size or a certain ratio of resources among flexible symbols are always available, flexible symbols may be used flexibly through DCI, and ambiguity between the UE and the BS caused by flexible symbols in the process of indicating or configuring a resource allocation to or for the UE by the BS may be reduced.

Overview of Example 4

As in Example 1 or Example 2, the UE may interpret a given resource allocation as a plurality of PUSCH transmissions or PDSCH transmissions, select an appropriate TBS for the PUSCH transmissions or PDSCH transmissions, and apply the TBS to each transmission or reception indicated/configured by the resource allocation. Considering that the resource size may be different for each transmission and a specific transmission may be excluded by a dynamic TDD operation, it may be important to determine an RV to be used for each transmission, for transmission reliability. For example, when data of RV0 is transmitted in resources with a large code rate larger than 1 due to a relatively small resource size, systematic bits may not be successfully transmitted, thereby significantly degrading transmission performance. Accordingly, the following method(s) may be performed in consideration of a resource size and an RV importance. The dynamic TDD operation refers to an operation of changing a transmission direction dynamically. For example, according to the dynamic TDD operation, a transmission direction may be determined for a symbol indicated semi-statically as flexible, that is, a semi-static flexible symbol by scheduling DCI or SFI DCI, or a preconfigured reception or transmission of the symbol may be canceled by scheduling DCI or SFI DCI.

Example 4-1

Resource allocation information may be indicated to or configured for the UE by the BS. The UE may interpret the resource allocation information as indicating N (N>1)

PUSCH transmissions or PDSCH receptions. Likewise, the BS may interpret the resource allocation information as indicating N (N>1) PUSCH transmissions or PDSCH receptions. In other words, a plurality of TOs may be determined based on information about one resource allocation. For example, one resource allocation indicated by the resource allocation information may be interpreted as N PUSCH transmissions or PDSCH receptions.

The BS may indicate or configure an RV sequence to be used for the transmissions to or for the UE. The UE and/or the BS may determine an RV to be applied to each of the N TOs based on the given RV sequence. The BS may perform the plurality of PDSCH transmissions based on the resource allocation information by sequentially applying the given RV sequence, starting from the first transmission. The UE may perform the plurality of PDSCH receptions based on the resource allocation information by applying the given RV sequence, starting from the first reception. The UE may perform the plurality of PUSCH transmissions based on the resource allocation information by applying the given RV sequence, starting from the first transmission. The BS may perform the plurality of PUSCH receptions based on the resource allocation information by applying the given RV sequence, starting from the first reception.

For example, when an RV sequence {RV2, RV3, RV1, RV0} is configured for PUSCH transmission, the UE may cyclically map the RV sequence to the N TOs in the order of RV2, RV3, RV1, and RV0, starting from RV2 for the first transmission, and perform the PUSCH transmission in at least one of the N TOs.

That is, the RV sequence may correspond to a plurality of resources in an index order, and thus the UE may sequentially apply the RV sequence to the resources.

Example 4-1 helps to solve the above problem by allowing the BS to flexibly associate RVs with a resource allocation.

For example, one piece of resource allocation information may be interpreted as indicating N resources {$CH_0$, $CH_1$, $CH_2$, ..., $CH(N-1)$}, and one RV sequence {R_0, R_1, R_2, R_3, ..., R_(M-1)} may be indicated or configured.

In some embodiments or implementations of the present disclosure, a plurality of RV sequences may be predefined or configured for the UE by the BS. The BS may indicate or configure an index linked to one of the plurality of RV sequences to or for the UE. An index indicating an RV sequence to be used for transmissions/receptions among the predefined or configured RV sequences may be indicated to the UE by higher-layer signaling (e.g., an RRC configuration) or L1 signaling (e.g., DCI).

When the RV sequence associated with the index indicated by RRC signaling or DCI is {R_0, R_1, R_2, R_3, ..., R_(M-1)}, the UE may perform each transmission or each reception in corresponding resources by using R_0 for resource $CH_0$, R_1 for resource $CH_1$, ..., R_K' for resource $CH_K$ (K'=K mod M).

For example, information about a resource allocation indicating a starting symbol of a slot, S=0 and a symbol length L=7 may be provided to the UE by DCI or RRC signaling. The resource allocation may be interpreted as a plurality of transmission resources or a plurality of TOs. For example, the UE or BS may determine that there are a plurality of sets of symbols for PUSCH/PDSCH transmissions based on the resource allocation. N resources {$CH_0$, $CH_1$, $CH_2$, ..., $CH_{(N-1)}$} for UL transmissions or DL transmissions may be determined based on the resource allocation information. In some embodiments or implementations of the present disclosure, each of the plurality of symbol sets may include one or more consecutive available symbols. In some embodiments or implementations of the present disclosure, since consecutive available symbols may be used for one PUSCH/PDSCH transmission as far as the symbols are not across a slot boundary, the plurality of symbol sets may be discontinuous from each other at least in the time domain or may be separated from each other by a slot boundary. In some embodiments or implementations of the present disclosure, available symbol(s) may be determined according to one of the methods according to Example 3. For example, the available symbol(s) may be determined based on a semi-static TDD DL-UL configuration. When a predefined RV sequence or an RV sequence configured for or indicated to the UE is {R_0, R_1, R_2, R_3, ..., R_(M-1)}, the UE may perform each transmission or each reception in corresponding resources by using R_0 for resource $CH_0$, R_1 for resource $CH_1$, ..., R_K' for resource $CH_K$ (K'=K mod M).

In another example, referring to FIG. 10(*a*), a set of the last L1 symbols of slot n, set #1 and a set of the first L2 symbols of slot n+1, set #2 may be determined as resources for the PUSCH/PDSCH based on information about one resource allocation or one piece of resource allocation information. When an RV sequence {0, 1, 2, 3} is predefined or indicated to or configured for the UE for the transmissions, the UE may transmit/receive a TB by applying RV0 to set #1 of L1 symbols and by applying RV1 to set #2 of L2 symbols.

Figure 12:
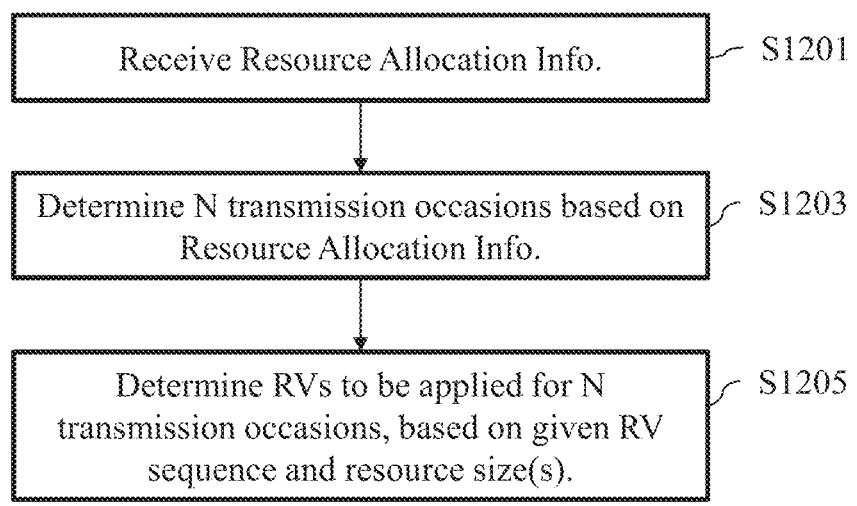
FIG. 12 is a flowchart illustrating a transmission operation according to an example of the present disclosure.

FIG. 12 is a flowchart illustrating a transmission operation related to some embodiments or implementations of the present disclosure. Resource allocation information may be indicated to or configured for the UE (S1201). The UE may interpret the resource allocation information as indicating N (N>1) PUSCH transmissions or PDSCH receptions (S1203). The BS may indicate or configure an RV sequence to be used for the transmissions to or for the UE. In some embodiments or implementations of the present disclosure, when the given RV sequence is applied to the N transmissions, resource size(s) based on the resource allocation information may be considered (S1205). In some embodiments or implementations of the present disclosure, the resource size(s) may be determined in consideration of the number of symbols. Alternatively, in some embodiments or implementations of the present disclosure, the resource size(s) may be determined based on the number of REs.

FIG. 13 is a diagram illustrating methods of applying an RV sequence according to some examples of the present disclosure. Particularly, FIG. 13(*a*) is related to example 4-2, FIG. 13(*b*) is related to example 4-3, and FIG. 13(*c*) is related to example 4-4. In FIG. 13, it is assumed that five resources {CH0, CH1, CH2, CH3, CH4} are determined based on one resource allocation. Further, it is also assumed in FIG. 13 that an RV sequence {RV0, RV1, RV2, RV3} is given.

Example 4-2

Resource allocation information may be indicated to or configured for the UE by the BS (S1201). The UE may interpret the resource allocation information as indicating N (N>1) PUSCH transmissions or PDSCH receptions (S1203). For example, a plurality of TOs may be determined based on information about one resource allocation. The BS may indicate or configure an RV sequence to be used for the transmissions to the UE. The UE may perform the plurality of PUSCH transmissions or PDSCH receptions by applying the given RV sequence sequentially in time order, starting from the largest resource (S1205). In the same manner, the BS may perform the plurality of PUSCH receptions or PDSCH transmissions by applying the given RV sequence sequentially in time order, starting from the largest resource based on the resource allocation information. In Example 4-2, transmission reliability may be increased by transmitting a relatively important initial RV value (e.g., RV0) at a high code rate.

For example, when one piece of resource allocation information is interpreted as indicating N resources $\{CH_0, CH_1, CH_2, \ldots, CH_{(N-1)}\}$ and an RV sequence $\{R\_0, R\_1, R\_2, R\_3, \ldots, R\_(M-1)\}$ is indicated to or configured for the UE, the UE may perform each transmission or reception in a corresponding resource by using R_0 for the largest resource $CH'_L$, R_1 for resource $CH'_{L+1}, \ldots, R\_K'$ for resource $CH'_K$ among N resources arranged in the order of transmission starting times, $\{CH'_0, CH'_1, CH'_2, \ldots, CH'_{(N-1)}\}$, where K=(L+n) mod N, n=0, 1, 2, ..., N−1, and K'=K mod M.

Referring to FIG. 13(a), for example, when five resources $\{CH_0, CH_1, CH_2, CH_3, CH_4\}$ are determined based on one resource allocation, the sizes of the five resources $\{CH_0, CH_1, CH_2, CH_3, CH_4\}$ are in the order of $CH_2 > CH_4 > CH_0 > CH_1 > CH_3$, and a given RV sequence is $\{RV0, RV1, RV2, RV3\}$, the RVs may be mapped in the order of $\{RV3, RV0, RV0, RV1, RV2\}$ to the five resources $\{CH_0, CH_1, CH_2, CH_3, CH_4\}$, respectively. The network/UE may perform the indicated transmissions/receptions by applying the mapped RV values to the corresponding resources in at least one of the five resources.

Example 4-3

Resource allocation information may be indicated to or configured for the UE by the BS (S1201). The UE may interpret the resource allocation information as indicating N (N>1) PUSCH transmissions or PDSCH receptions (s1203). For example, a plurality of TOs may be determined based on information about one resource allocation. The BS may indicate or configure an RV sequence to be used for the transmissions to the UE. The UE may perform the plurality of PUSCH transmissions or PDSCH receptions by sequentially applying the given RV sequence to the transmissions or receptions in a descending order of resource sizes (S1205). In Example 4-3, relatively important first half RVs (e.g., RV0 and RV2, or RV0 and RV3) may be transmitted at a high code rate with high reliability, thereby increasing transmission reliability.

For example, one piece of resource allocation information is interpreted as indicating N resources $\{CH_0, CH_1, CH_2, \ldots, CH_{(N-1)}\}$ and an RV sequence $\{R\_0, R\_1, R\_2, R\_3, \ldots, R\_(M-1)\}$ is indicated to or configured for the UE, the UE may perform each transmission or reception in a corresponding resource by using $RV_0$ for the largest resource CH'0, R_1 for resource CH'1, ..., R_K' for resource CH'K among N resources arranged in a descending order of resource sizes, $\{CH'_0, CH'_1, CH'_2, \ldots, CH'_{(N-1)}\}$, where K'=K mod M.

Referring to FIG. 13(b), for example, when five resources $\{CH_0, CH_1, CH_2, CH_3, CH_4\}$ are determined based on one resource allocation, the sizes of the five resources $\{CH_0, CH_1, CH_2, CH_3, CH_4\}$ are in the order of $CH_2 > CH_4 > CH_0 > CH_1 > CH_3$, and a given RV sequence is $\{RV0, RV1, RV2, RV3\}$, the RVs may be mapped in the order of $\{RV2, RV3, RV0, RV0, RV1\}$ to the five resources $\{CH_0, CH_1, CH_2, CH_3, CH_4\}$, respectively. The network/UE may perform the indicated transmissions/receptions in at least one of the five resources by applying the mapped RV values to the corresponding resources.

Example 4-4

Resource allocation information may be indicated to or configured for the UE by the BS (S1201). The UE may interpret the resource allocation information as indicating N (N>1) PUSCH transmissions or PDSCH receptions (S1203). For example, a plurality of TOs may be determined based on information about one resource allocation. The BS may indicate or configure an RV sequence to be used for the transmissions to the UE. The UE may perform the plurality of PUSCH transmissions or PDSCH receptions by applying the given RV sequence to the transmissions or receptions sequentially in time order, starting from a resource with an appropriate size (S1205). Example 4-4 may increase transmission reliability and minimize a latency which might otherwise be caused by transmitting a relatively important initial RV value (e.g., RV0) at a high code rate with high reliability.

For example, one piece of resource allocation information is interpreted as indicating N resources $\{CH_0, CH_1, CH_2, \ldots, CH_{(N-1)}\}$ and an RV sequence $\{R\_0, R\_1, R\_2, R\_3, \ldots, R\_(M-1)\}$ is indicated to or configured for the UE, the UE may perform each transmission or reception by using R_0 for the first resource $CH'_P$, R_1 for resource $CH'P+1, \ldots, R\_K'$ for resource $CH'_K$ among resources available for transmission of bits of the specific bit length B among N resources arranged in an order of transmission starting time, $\{CH'_0, CH'_1, CH'_2, \ldots, CH'_{(N-1)}\}$, where K=(P+n) mod N, n=0, 1, 2, ..., N−1, and K'=K mod M. Resource available for transmission of bits of the specific bit length B may mean, for example, resources having enough REs to which all of the bits of the specific bit length B may be mapped. The specific bit length B may be equal to a given TBS or may be obtained from the given TBS. For example, when C is a certain code rate, K=TBS*C^(−1). The code rate C may be a value obtained by applying some offset to an MCS index given by DCI, the largest value in a used MCS table, a value indicated by L1 signaling or higher-layer signaling, or a predetermined value.

Referring to FIG. 13(c), for example, when five resources $\{CH_0, CH_1, CH_2, CH_3, CH_4\}$ are determined based on one resource allocation, the sizes of the five resources $\{CH_0, CH_1, CH_2, CH_3, CH_4\}$ are in the order of $CH_2 > CH_4 > CH_0 > CH_1 > CH_3$, and a given RV sequence is $\{RV0, RV1, RV2, RV3\}$, the RVs may be mapped in the order of $\{RV0, RV0, RV1, RV2, RV3\}$ to the five resources $CH_2 > CH_4 > CH_0 > CH_1 > CH_3$, respectively. The network/UE may perform the indicated transmissions/receptions in at least one of the five resources by applying the mapped RV values to the corresponding resources.

Example 4-5

Resource allocation information may be indicated to or configured for the UE by the BS (S901). The UE may interpret the resource allocation information as indicating N (N>1) PUSCH transmissions or PDSCH receptions (S903). For example, a plurality of TOs may be determined based on information about one resource allocation. The BS may indicate or configure an RV sequence to be used for the transmissions to the UE. The BS may configure the RV sequence in the order of $\{RV0, RV3, RV1, RV2\}$ or $\{RV0, RV1, RV3, RV2\}$. This RV order may be a descending order of the number of systematic bits.

When repeated transmissions and a UL configured grant and/or DL SPS are configured, an RV sequence {RV0, RV2, RV3, RV1}, an RV sequence {RV0, RV3, RV0, RV3}, or an RV sequence {RV0, RV0, RV0, RV0} may be used.

Or when repeated transmissions and a UL configured grant and/or DL SPS are configured for URLLC, an RV sequence {RV0, RV1, RV0, RV1}, an RV sequence {RV0, RV3, RV1, RV2}, or an RV sequence {RV0, RV1, RV3, RV2} may be considered instead of or in addition to the RV sequence {RV0, RV2, RV3, RV1}, the RV sequence {RV0, RV3, RV0, RV3}, or the RV sequence {RV0, RV1, RV0, RV1}.

When one resource is divided into several smaller resources, Example 4-5 may be considered to include minimum systematic bit(s) in the smaller resources.

Among N transmissions based on one resource allocation or one resource allocation message (e.g., DCI or an RRC-configured grant), a corresponding transmission may be dropped/skipped by SFI DCI or scheduling/triggering DCI. According to Example 4-1, Example 4-2, Example 4-3, or Example 4-5, RV mapping of an RV sequence may be performed with no regard to dropping/skipping of a transmission by DCI (e.g., SFI DCI and/or scheduling/triggering DCI) carried on a PDCCH. Therefore, the UE and the network may be prevented from assuming different RV values for a specific TO/resource due to DCI loss.

Overview of Example 5

In Example 5, a process of determining a resource allocation is described.

A plurality of factors may be considered in the process of determining resources to be actually used for transmission by a UE which resource allocation information has been indicated to or configured for. For example, a configuration and indication for other transmissions as well as an indication or configuration required for a TDD operation, such as a TDD UL-DL configuration and a slot format, may need to be considered. Further, higher-layer parameters related to rate matching may have to be applied. These factors may have different characteristics (e.g., semi-static or dynamic), and the UE may receive the factors at various timings.

The result of a resource allocation may be used for TBS determination, RV determination, and frequency hopping boundary determination. The TBS determination, RV determination, and frequency hopping boundary determination should be performed before the transmission time of the corresponding signal, more specifically, a transmission preparation time (e.g., a PDSCH/PUSCH preparation time). Especially when a preconfigured PDSCH/PUSCH is used as is the case with SPS and a configured grant, even though the length and size of actually transmitted resources are changed by the above factors, it may be important to have the same TBS or the same TO if possible, in order to satisfy a traffic requirement.

In Example 5, to statically determine a TBS, an RV, and a frequency hopping boundary while the above-described various factors are considered, some of the above factors are applied to determine actual transmitted resources in a plurality of steps, and the TBS, the RV, and the frequency hopping boundary are determined in an intermediate step. Thus, the TBS, the RV, and so on are determined before dynamically variable factors are considered. Example 5 may include methods and steps for applying resource allocation information. Radio resources required to determine a TBS, an RV, and so on in Examples 2 and 4 may be determined by the methods and steps in Example 5.

In Example 5, a TO may refer a resource allocation unit in which one of one or more repeated transmissions of one TB may be performed. While a TO is described below from the perspective of UL, when Example 5 is applied to DL transmission and reception, a TO may be interpreted as an RO.

In Example 5, a process of determining a resource allocation may include the following steps.

1. Reception of Resource Allocation Information

Resource allocation information may include two types of resource allocation information: type 1 and type 2. In other words, some of the received resource allocation information may be identified as one of the two types of resource allocation information, type 1 or type 2.

Type-1 resource allocation information is information used to determine the physical location of resources, and determine a pattern of repeated transmissions, when the repeated transmissions are performed. For example, the type-1 resource allocation information may be the following information:

a starting symbol, the symbol duration of each repetition, and a DMRS mapping type;

a frequency hopping flag and an offset;

DMRS ports and an RV pattern;

a maximum repetition number and the duration/length of each repetition; and/or an ending slot and the ending symbol of the last TO.

Type-2 resource allocation information is information used to determine the validity of resources. Or type-2 resource allocation information may be information including a condition for determining validity. For example, the type-2 resource allocation information may be the following information:

a minimum duration/length of each repetition;

a minimum/required repetition number, a total/minimum length/duration limit, and a minimum/required code rate; and/or a time window of TOs for one TB.

Each piece of resource allocation information may be configured or indicated by L1 signaling and/or higher-layer signaling from the BS.

Specific resource allocation information (e.g., a repetition number and a target code rate) may be semi-statically or dynamically applied as type-1 or type-2 resource allocation information. The BS may indicate or configure the type of resource allocation information or a flag that determines the type to the UE.

2. Determination of Nominal Resource Allocation

A nominal resource allocation is the logical and physical locations of a TO or an RO.

The physical location of the nominal resource allocation may be determined from the logical location of the nominal resource allocation in consideration of a slot format and so on.

An actual transmission or reception of resources may be performed in one or more TOs or ROs given by type-1 resource allocation information.

Information applied in step 2 may have at least one of the following features:

slot format information delivered by semi-static signaling (e.g., a cell configuration such as a TDD UL-DL configuration or an SSB);

L1 signaling delivered until before the reception time of a scheduling message or until before a predetermined time from the reception time; and/or type-1 resource allocation information.

3. Determination of Actual Resource Allocation

An actual resource allocation is a resource allocation to be used for an actual transmission, determined by applying the remaining factors which are not considered for the nominal resource allocation. Information applied in step 3 may be the remaining factors except for factors applied in step 2 or information having at least one of the following features:

- slot format information delivered by L1 signaling. For example, DCI format 2_0 or other scheduling DCI (e.g., format 00, format 0_1, format 10, and format 11);
- L1 signaling delivered after the reception time of a scheduling message or a predetermined time after the reception time; and/or
- type-2 resource allocation information.

In step 1, the UE may receive resource allocation information from the BS. The UE may determine a nominal resource allocation in consideration of pre-indicated or preconfigured other information elements based on the received resource allocation information. The nominal resource allocation may be determined in step 2 in the following manner.

To determine the nominal resource allocation, the length L and starting position S of a first TO are determined based on the given resource allocation information. When repeated transmissions are configured or indicated, the nominal resource allocation may be repeated in the following manner. The UE may select, as the next TO, consecutive symbols of the same length from the last symbol of a determined previous TO. In this operation, the following may be additionally considered.

Option 1: The UE may postpone a transmission scheduled by a given resource allocation to the next TO. When consecutive available symbols of a length L from a given starting position S do not exist in the previous TO, the BS or the UE may determine a new starting position S' from which consecutive symbols of the length L are available among symbols following the starting position S in the corresponding TO based on information that determines a symbol transmission direction such as a TDD UL-DL configuration. For example, when L consecutive UL symbols are needed, a new starting position S' from which L consecutive UL symbols are available may be determined. Option 1 enables the UE to arbitrarily use a given resource allocation in another TO available for transmission based on information such as the slot format of a corresponding slot. According to Option 1, the BS does not need to provide a resource allocation strictly aligned with a slot format, and the UE may use as many radio resources as possible by arbitrarily changing a given resource allocation.

Option 2: When there are no consecutive available symbols of a length L from the starting position S of a given initial TO, a corresponding transmission may not be performed. Option 2 prevents the UE from changing resources given by the BS so that when the BS performs semi-static scheduling, the remaining resources may be used as dynamically as possible, and prohibits the UE from using some resources according to an intent of the BS so that the BS may schedule the resources for other UEs.

When the BS indicates or configures a repetition number K to configure or indicate repeated transmissions, the repetition number K may be indicated as type 1-resource allocation information or type-2 resource allocation information.

When the repetition number K is indicated as type-1 resource allocation information, the UE may determine as many TOs as the repetition number K as a nominal resource allocation. Therefore, the UE is allowed to transmit and receive only in a predetermined resource area, which facilitates other UEs to use resources separately. Alternatively, for this operation, the BS may set a separate parameter KM indicating a maximum number of TOs. More specifically, the maximum repetition number KM may be set separately from K and used to determine the number of TOs in the nominal resource allocation.

When the repetition number K is indicated as type-2 resource allocation information, the UE may determine a logical TO of an infinite length as a nominal resource allocation when needed, or determine as many TOs as possible within a predetermined period as a nominal resource allocation. The predetermined period may be determined based on a periodicity and an offset for DL SPS or a UL configured grant, or may be the ending time of repeated transmissions separately indicated or configured by L1 signaling and/or higher-layer signaling from the BS. Alternatively, a specific ratio of the repetition number K or a value obtained by adding an offset to the repetition number K may be used as the number of TOs in the nominal resource allocation.

When one TO crosses a slot boundary, the TO may be divided into two TOs by the slot boundary. In this case, the two divided TOs may be counted as one TO so that the TOs may have similar resource allocations in terms of resource sizes.

The UE may determine an actual resource allocation to be used for an actual transmission from the determined nominal resource allocation. The UE may determine the actual resource allocation by selectively using all or some of the TOs of the nominal resource allocation. For this purpose, the UE may first select available TOs from among the TOs of the nominal resource allocation. In this case, the methods described in Example 3 may be used.

Further, to reduce latency and increase transmission reliability, an actual resource allocation of a predetermined size or larger within a predetermined period needs to be guaranteed for the UE. For this purpose, the BS may indicate or configure type-2 resource allocation information, for example, at least one of the following parameters to or for the UE by L1 signaling and/or higher-layer signaling.

- Minimum/required repetition number: Based on a parameter regarding the minimum/required repetition number, a minimum number of TOs of the selected actual resource allocation may be determined. The parameter regarding the minimum/required repetition number may be useful for selecting a sufficient number of TOs to satisfy the requirement of transmission reliability.
- Maximum repetition number: Based on a parameter regarding the maximum repetition number, a maximum number of TOs of the selected actual resource allocation may be determined. The parameter regarding the maximum repetition number may be useful for the UE or the BS to determine the actual resource allocation to satisfy the latency requirement, when a logically infinite or large number of nominal TOs are configured.
- Minimum length/duration limit: Based on a parameter regarding the minimum length/duration limit, a minimum value of the total length of the selected actual resource allocation may be determined. The parameter regarding the minimum length/duration limit may be useful for selecting a sufficient number of TOs to satisfy the requirement of transmission reliability.

Total length/duration limit: A maximum value of the total length of the selected actual resource allocation may be determined based on a parameter regarding the total length/duration limit. The parameter regarding the total length/duration limit may be useful for determining the actual resource allocation to satisfy the latency requirement, when a logically infinite or large number of nominal TOs are configured.

Minimum/required code rate: A minimum/required code rate may be a value that determines the minimum value of the code rate of the selected actual resource allocation. The minimum/required code rate may be derived from an indicated or configured repetition number and a target code rate indicated by an MCS. For example, the minimum/required code rate may be determined by (target code rate)/(repetition number). A parameter regarding the minimum/required code rate may be useful when a TO of the nominal resource allocation is divided by a slot boundary and thus the target code rate may not be achieved even through repeated transmissions of an indicated or configured size.

The UE and/or the BS selects as many TOs as needed as an actual resource allocation from among the selected nominal resource(s) to satisfy indicated or configured information. In this case, the UE and/or the BS may select the TOs as the actual resource allocation, starting from as early a TO as possible to reduce latency, or select the TOs as the actual resource allocation, starting from a TO having a resource size (e.g., the number of REs) as large as possible to increase reliability. When the indicated or configured information is not satisfied in view of the presence of no TOs or insufficient TOs, the UE may drop the transmission from the corresponding nominal resource allocation. For example, when a configured minimum repetition number is 3 and it is difficult to perform three repeated transmissions within a given time window due to shortage of consecutive UL symbols of an indicated resource length, the UE may drop the transmission.

In the above-described process, the UE may obtain TOs that satisfy the required latency and reliability by determining a nominal resource allocation and determining an actual resource allocation from the nominal resource allocation. In another example or another process of determining transmission parameters of the present disclosure, a resource allocation may serve as a determination criterion. For example, when Example 2 or Example 4 is used, the length of a TO for transmitting one TB or the sum of the lengths of all TOs may be used to determine a TBS, or a resource allocation may be considered for sequentially applying an RV pattern (i.e., RV sequence). Since there are two types of resource allocations: nominal resource allocation and real resource allocation in Example 5, there is a need for a method of reflecting the result of the more effective resource allocation between the two resource allocations to apply the resource allocations to other example(s). In particular, when a resource allocation may be dynamically changed due to factors such as DCI loss according to a method for determining a resource allocation, the BS and the UE may make different determinations, thereby greatly affecting transmission reliability. Now, a description will be given of a method of determining a resource allocation serving as a reference when a transmission parameter is determined by applying Example 2 or Example 4 or in consideration of resource allocation.

Example 5-1

When Example 2 is used, a TBS may be determined based on only received resource information, not based on a nominal or actual resource allocation. For example, when a TBS is determined based on the length of transmission resources (e.g., the number of REs) used for transmission of one TB, the TBS may be determined based on a time-axis length, a frequency-axis length, and a repetition number, which are available for one repeated transmission indicated or configured in step 1. Example 5-1 prevents a TBS from being changed by the slot format of a slot used for a transmission or other transmissions indicated by higher-layer signaling. Therefore, Example 5-1 may be useful in DL SPS or a UL configured grant, which provides a specific service.

Example 5-2

When Example 2 or Example 4 is used, a TBS and/or RV sequence mapping may be determined based on the nominal resource allocation defined in step 2. For example, the UE and/or the BS may apply Example 2 or Example 4, considering the nominal resource allocation to be allocation of a plurality of resources for transmitting one TB. More specifically, the UE and/or the BS may determine a TBS based on the first TO of the nominal resource allocation, or map an RV sequence in a descending order of the resource sizes of the TOs of the nominal resource allocation. According to Example 5-2, the UE mainly uses information obtained from higher-layer signaling. Therefore, Example 5-2 makes the UE and the BS obtain the same information by minimizing a DCI loss-incurred mismatch between the UE and the BS, thereby reflecting, as much as possible, a case where specific resources and TOs such as a slot format are lost. This helps to ensure that an actual transmission reaches a target code rate as far as possible.

Example 5-3

When frequency hopping is configured for or indicated to the UE, the UE may perform frequency hopping based on the nominal resource allocation defined in step 2. For example, when N TOs exist in one slot in a time-axis nominal resource allocation, frequency hopping may be performed in one of ceil (N/2) or floor (N/2) consecutive TOs. Alternatively, when the UE is configured or indicated to perform frequency hopping at every repeated transmission, the UE or the BS may apply a frequency hopping offset to every even-numbered TO in the nominal resource allocation. According to Example 5-3, the UE mainly uses information obtained from higher-layer signaling. Therefore, Example 5-3 makes the UE and the BS obtain the same information by minimizing a DCI loss-incurred mismatch between the UE and the BS, thereby reflecting, as much as possible, a case where specific resources and TOs such as a slot format are lost. This helps to improve overall system performance because loss of frequency diversity based on frequency hopping is prevented even though an actual transmission is partially lost by a TDD UL-DL configuration. Example 5-3 may be useful particularly for frequency hopping between repeated transmissions (e.g., a method of performing frequency hopping at every repeated transmission). The examples of the present disclosure as described above have been presented to enable any person of ordinary skill in the art to implement and practice the present disclosure.

Although the present disclosure has been described with reference to the examples, those skilled in the art may make various modifications and variations in the example of the present disclosure. Thus, the present disclosure is not intended to be limited to the examples set for the herein, but is to be accorded the broadest scope consistent with the principles and features disclosed herein.

The implementations of the present disclosure may be used in a BS, a UE, or other equipment in a wireless communication system.

What is claimed is:

1. A base station (BS) configured to receive a physical uplink shared channel (PUSCH) transmission from a user equipment (UE) in a wireless communication system, the BS comprising:
   at least one transceiver;
   at least one processor; and
   at least one computer memory storing instructions which, when executed, cause the at least one processor to perform operations comprising:
   transmitting, to the UE, information regarding (i) a resource allocation for transmission occasions for PUSCH transmissions, (ii) an index regarding a redundancy version (RV) sequence for the PUSCH transmissions, and (iii) a time division duplex (TDD) uplink-downlink configuration;
   determining symbols available for the PUSCH transmissions based on the TDD uplink-downlink configuration;
   determining actual transmission occasions among the transmission occasions based on the resource allocation and the symbols available for the PUSCH transmissions; and
   receiving, from the UE, at least one PUSCH transmission of the PUSCH transmissions in at least one of the actual transmission occasions based on a respective RV value for each of the at least one of the actual transmission occasions based on the RV sequence,
   wherein the RV sequence is a sequence of RV values that are arranged in a configured order,
   wherein the sequence of RV values in the RV sequence is cyclically applied to the actual transmission occasions, starting from an initial RV value in the sequence of RV values applied to an initial transmission occasion among the actual plurality of transmission occasions, and
   wherein the sequence of RV values is cyclically applied to the actual transmission occasions in the configured order in which the sequence of RV values is arranged.

2. The BS according to claim 1, wherein each of the actual transmission occasions includes at least one symbol available for uplink transmissions.

3. The BS according to claim 1, wherein the transmission occasions include at least two transmission occasions that are separated by a slot boundary or by symbols determined unavailable for the uplink transmissions based on the TDD uplink-downlink configuration.

4. A method of performing, by a user equipment, a physical uplink shared channel (PUSCH) transmission in a wireless communication system, the method comprising:
   receiving information regarding (i) a resource allocation for transmission occasions for PUSCH transmissions, (ii) an index regarding a redundancy version (RV) sequence for the PUSCH transmissions, and (iii) a time division duplex (TDD) uplink-downlink configuration;
   determining symbols available for the PUSCH transmissions based on the TDD uplink-downlink configuration;
   determining actual transmission occasions among the transmission occasions based on the resource allocation and the symbols available for the PUSCH transmissions; and
   performing at least one PUSCH transmission of the PUSCH transmissions in at least one of the actual transmission occasions based on a respective RV value for each of the at least one of the actual transmission occasions based on the RV sequence,
   wherein the RV sequence is a sequence of RV values that are arranged in a configured order,
   wherein the sequence of RV values in the RV sequence is cyclically applied to the actual transmission occasions, starting from an initial RV value in the sequence of RV values applied to an initial transmission occasion among the actual transmission occasions, and
   wherein the sequence of RV values is cyclically applied to the actual transmission occasions in the configured order in which the sequence of RV values is arranged.

5. The method according to claim 4, wherein each of the actual transmission occasions includes at least one symbol available for uplink transmissions.

6. The method according to claim 4, wherein the transmission occasions include at least two transmission occasions that are separated by a slot boundary or by symbols determined unavailable for the uplink transmissions based on the TDD uplink-downlink configuration.

7. A user equipment (UE) configured to perform a physical uplink shared channel (PUSCH) transmission in a wireless communication system, the UE comprising:
   at least one transceiver;
   at least one processor; and
   at least one computer memory storing instructions which, when executed, cause the at least one processor to perform operations comprising:
   receiving information regarding (i) a resource allocation for transmission occasions for PUSCH transmissions, (ii) an index regarding a redundancy version (RV) sequence for the PUSCH transmissions, and (iii) a time division duplex (TDD) uplink-downlink configuration;
   determining symbols available for the PUSCH transmissions based on the TDD uplink-downlink configuration;
   determining actual transmission occasions among the transmission occasions based on the resource allocation and the symbols available for the PUSCH transmissions; and
   performing at least one PUSCH transmission of the PUSCH transmissions in at least one of the actual transmission occasions based on a respective RV value for each of the at least one of the actual transmission occasions based on the RV sequence,
   wherein the RV sequence is a sequence of RV values that are arranged in a configured order,
   wherein the sequence of RV values in the RV sequence is cyclically applied to the actual transmission occasions, starting from an initial RV value in the sequence of RV values applied to an initial transmission occasion among the actual transmission occasions, and
   wherein the sequence of RV values is cyclically applied to the actual transmission occasions in the configured order in which the sequence of RV values is arranged.

8. The UE according to claim 7, wherein each of the actual transmission occasions includes at least one symbol available for uplink transmissions.

9. The UE according to claim 7, wherein the transmission occasions include at least two transmission occasions that are separated by a slot boundary or by symbols determined unavailable for the uplink transmissions based on the TDD uplink-downlink configuration.

\* \* \* \* \*